(12) United States Patent  (10) Patent No.: US 7,921,945 B2
Harris  (45) Date of Patent: Apr. 12, 2011

(54) VEHICULAR SWITCHING, INCLUDING SWITCHING TRACTION MODES AND SHIFTING GEARS WHILE IN ELECTRIC TRACTION MODE

(75) Inventor: Warner Olan Harris, Cerritos, CA (US)

(73) Assignee: Clean Emissions Technologies, Inc., Eastland, TX (US)

( * ) Notice: Subject to any disclaimer, the term of this patent is extended or adjusted under 35 U.S.C. 154(b) by 567 days.

(21) Appl. No.: 12/060,368

(22) Filed: Apr. 1, 2008

(65) Prior Publication Data

US 2008/0243324 A1    Oct. 2, 2008

Related U.S. Application Data

(63) Continuation-in-part of application No. 11/558,786, filed on Nov. 10, 2006, now Pat. No. 7,600,595, which is a continuation-in-part of application No. 11/374,709, filed on Mar. 14, 2006.

(60) Provisional application No. 60/909,748, filed on Apr. 3, 2007, provisional application No. 60/774,732, filed on Feb. 21, 2006.

(51) Int. Cl.
B60W 20/00      (2006.01)
B60W 10/04      (2006.01)

(52) U.S. Cl. ......... 180/65.285; 701/22; 701/51; 701/54; 701/104; 701/105; 701/108; 60/605.2; 180/65.1; 180/65.235; 180/65.23; 180/65.24; 477/3; 477/4; 477/5; 477/6

(58) Field of Classification Search ................. 180/65.1, 180/65.235, 65.23, 65.24, 65.285; 123/350, 123/352, 357, 478, 480, 568.4, 568.21; 60/605.2; 701/22, 51, 54, 104, 105, 108; 477/3–6

See application file for complete search history.

(56) References Cited

U.S. PATENT DOCUMENTS 1,726,760 A    9/1929    Otwell
(Continued)

FOREIGN PATENT DOCUMENTS

DE    4204384 A1    8/1993
(Continued)

OTHER PUBLICATIONS

"Power Take-Offs"; http://www.gears-manufacturers.com/power-take-offs.html; 3 pages.

(Continued)

Primary Examiner — Khoi Tran
Assistant Examiner — Bhavesh V Amin
(74) Attorney, Agent, or Firm — Kelly Kordzik; Anthony V. S. England; Fish & Richardson P.C.

(57) ABSTRACT

A vehicle has an internal combustion engine (ICE) and a electric traction motor (ETM) coupled by a standard transmission through a differential to drive traction wheels. A control system receives sensor signals including speed sensors, a load sensor, and an incline sensors. The control system processes the speed signals to generate indicator signals corresponding to speed of the ETM, the vehicle speed, the shifting gears and the speed of the transmission output shaft. One or more displays present indications of when the speed of a shifting gear corresponding to the speed of the ETM matches the speed of the vehicle thus the speed of the transmission output shaft. An operator may shift, without clutching, from neutral and to a next shifting gear when there is an indication that the speed of the next shifting gear matches the speed of a shifting collar coupled to the transmission output shaft.

29 Claims, 12 Drawing Sheets

U.S. PATENT DOCUMENTS

| | | | |
|---|---|---|---|
| 2,467,398 A | 4/1949 | Miller | |
| 2,810,293 A | 10/1957 | George et al. | |
| 2,923,171 A | 2/1960 | Jedrzykowski | |
| 2,930,242 A | 3/1960 | George | |
| 3,209,604 A | 10/1965 | Mitchell et al. | |
| 3,241,628 A | 3/1966 | Thomas | |
| 3,597,935 A | 8/1971 | Pierrat | |
| 3,599,814 A | 8/1971 | Brownfield | |
| 3,646,773 A | 3/1972 | Falk et al. | |
| 3,716,768 A | 2/1973 | Mason | |
| 3,792,327 A | 2/1974 | Waldorf | |
| 3,882,950 A | 5/1975 | Strohlein | |
| 4,193,271 A | 3/1980 | Honigsbaum | |
| 4,271,677 A | 6/1981 | Harr | |
| 4,280,330 A | 7/1981 | Harris et al. | |
| 4,438,342 A | 3/1984 | Kenyon | |
| 4,448,157 A | 5/1984 | Eckstein et al. | |
| 4,461,988 A | 7/1984 | Plunkett | |
| 4,470,476 A | 9/1984 | Hunt | |
| 4,588,040 A | 5/1986 | Albright, Jr. | |
| 4,658,599 A | 4/1987 | Kajiwara | |
| 4,711,204 A | 12/1987 | Rusconi | |
| 4,712,636 A | 12/1987 | Ishimatsu | |
| 4,732,229 A | 3/1988 | Lucht | |
| 4,825,663 A | 5/1989 | Nijjar et al. | |
| 4,828,452 A | 5/1989 | Bolitho | |
| 4,846,327 A | 7/1989 | Mayer | |
| 4,947,657 A | 8/1990 | Kalmbach | |
| 4,976,114 A | 12/1990 | Manning | |
| RE33,687 E | 9/1991 | Greer | |
| 5,046,326 A | 9/1991 | Havemann et al. | |
| 5,048,657 A | 9/1991 | Dissett et al. | |
| 5,190,118 A | 3/1993 | Yelton | |
| 5,255,733 A | 10/1993 | King | |
| 5,267,635 A | 12/1993 | Peterson et al. | |
| 5,307,645 A | 5/1994 | Pannell | |
| 5,343,970 A | 9/1994 | Severinsky | |
| 5,346,031 A | 9/1994 | Gardner | |
| 5,522,778 A | 6/1996 | Iwase et al. | |
| 5,558,588 A | 9/1996 | Schmidt | |
| 5,637,987 A | 6/1997 | Fattic | |
| 5,644,200 A | 7/1997 | Yang | |
| 5,656,921 A | 8/1997 | Farrall | |
| 5,667,029 A | 9/1997 | Urban | |
| 5,669,842 A | 9/1997 | Schmidt | |
| 5,722,911 A | 3/1998 | Ibaraki | |
| 5,755,303 A | 5/1998 | Yamamoto | |
| 5,773,904 A | 6/1998 | Schiebold et al. | |
| 5,775,449 A | 7/1998 | Moroto | |
| 5,799,632 A | 9/1998 | Bennett | |
| 5,799,744 A | 9/1998 | Yamaguchi | |
| 5,801,499 A | 9/1998 | Tsuzuki | |
| 5,806,617 A | 9/1998 | Yamaguchi | |
| 5,810,321 A | 9/1998 | Presson | |
| 5,815,824 A | 9/1998 | Saga et al. | |
| 5,823,282 A | 10/1998 | Yamaguchi | |
| 5,841,201 A | 11/1998 | Tabata | |
| 5,842,534 A | 12/1998 | Frank | |
| 5,845,731 A | 12/1998 | Buglione | |
| 5,847,469 A | 12/1998 | Tabata | |
| 5,862,497 A | 1/1999 | Yano | |
| 5,881,564 A | 3/1999 | Kishimoto | |
| 5,887,670 A | 3/1999 | Tabata | |
| 5,896,750 A | 4/1999 | Karl | |
| 5,942,879 A | 8/1999 | Ibaraki | |
| 5,951,614 A | 9/1999 | Tabata | |
| 6,038,877 A | 3/2000 | Peiffer et al. | |
| 6,059,059 A | 5/2000 | Schmidt-Brucken | |
| 6,080,081 A | 6/2000 | Sauermann et al. | |
| 6,138,788 A | 10/2000 | Bohner et al. | |
| 6,151,891 A | 11/2000 | Bennett | |
| 6,155,364 A | 12/2000 | Nagano et al. | |
| 6,164,400 A | 12/2000 | Jankovic | |
| 6,209,672 B1 | 4/2001 | Severinsky | |
| 6,269,713 B1 | 8/2001 | Ohke | |
| 6,276,161 B1 | 8/2001 | Peiffer et al. | |
| 6,318,486 B2 | 11/2001 | Masaki | |
| 6,332,257 B1 | 12/2001 | Reed, Jr. et al. | |
| 6,338,391 B1 | 1/2002 | Severinsky | |
| 6,340,339 B1 | 1/2002 | Tabata et al. | |
| 6,367,570 B1 | 4/2002 | Long, III | |
| 6,405,818 B1 | 6/2002 | Anthony | |
| 6,419,040 B2 | 7/2002 | Kitano | |
| 6,427,100 B1 | 7/2002 | Kaku | |
| 6,441,506 B2 | 8/2002 | Nakashima | |
| 6,480,767 B2 | 11/2002 | Yamaguchi et al. | |
| 6,484,831 B1 | 11/2002 | Gauthier | |
| 6,488,345 B1 | 12/2002 | Woody et al. | |
| 6,488,609 B1 | 12/2002 | Morimoto | |
| 6,519,513 B2 | 2/2003 | Nakagawa | |
| 6,520,160 B2 | 2/2003 | Kojima | |
| 6,554,088 B2 | 4/2003 | Severinsky | |
| 6,557,655 B2 | 5/2003 | Ovshinsky | |
| 6,558,290 B2 | 5/2003 | Phillips | |
| 6,570,265 B1 | 5/2003 | Shiraishi | |
| 6,616,569 B2 | 9/2003 | Hoang | |
| 6,629,027 B2 | 9/2003 | Yamaguchi | |
| 6,651,759 B1 | 11/2003 | Gruenwald et al. | |
| 6,658,852 B2 | 12/2003 | Frey | |
| 6,664,651 B1 | 12/2003 | Kotre et al. | |
| 6,672,415 B1 | 1/2004 | Tabata | |
| 6,687,603 B2 | 2/2004 | Wakashiro | |
| 6,688,411 B2 | 2/2004 | Boggs | |
| 6,692,403 B2 | 2/2004 | Charaudeau et al. | |
| 6,694,232 B2 | 2/2004 | Saito | |
| 6,705,416 B1 | 3/2004 | Glonner | |
| 6,712,165 B1 | 3/2004 | Okazaki | |
| 6,721,637 B2 | 4/2004 | Abe | |
| 6,735,502 B2 | 5/2004 | Phillips | |
| 6,740,987 B2 | 5/2004 | Kitajima | |
| 6,745,117 B1 | 6/2004 | Thacher | |
| 6,768,932 B2 | 7/2004 | Claypole | |
| 6,781,251 B2 | 8/2004 | Takaoka | |
| 6,787,932 B2 | 9/2004 | Takaoka | |
| 6,796,367 B2 | 9/2004 | Blacquiere et al. | |
| 6,805,211 B2 | 10/2004 | Fujikawa | |
| 6,808,470 B2 | 10/2004 | Boll | |
| 6,840,341 B2 | 1/2005 | Fujikawa | |
| 6,851,470 B2 | 2/2005 | Laukhuf | |
| 6,857,985 B2 | 2/2005 | Williams | |
| 6,862,511 B1 | 3/2005 | Phillips et al. | |
| 6,867,509 B1 | 3/2005 | Takaoka | |
| 6,868,927 B2 | 3/2005 | Boll | |
| 6,881,167 B2 | 4/2005 | Inada | |
| 6,892,541 B2 | 5/2005 | Suzuki | |
| 6,907,337 B2 | 6/2005 | Phillips et al. | |
| 6,915,198 B2 | 7/2005 | Phillips et al. | |
| 6,921,984 B2 | 7/2005 | Rogg | |
| 6,966,868 B2 | 11/2005 | Stork et al. | |
| 6,986,645 B2 | 1/2006 | Iwanami | |
| 6,991,053 B2 | 1/2006 | Kuang | |
| 6,994,177 B2 | 2/2006 | Ito | |
| 6,994,360 B2 | 2/2006 | Kuang | |
| 6,998,727 B2 | 2/2006 | Gray | |
| 7,004,273 B1 | 2/2006 | Gruenwald | |
| 7,021,409 B2 | 4/2006 | Tamor | |
| 7,035,727 B2 | 4/2006 | De La Salle et al. | |
| 7,055,337 B2 | 6/2006 | Horn | |
| 7,055,636 B2 | 6/2006 | Komiyama | |
| 7,091,839 B2 | 8/2006 | Situ et al. | |
| 7,102,313 B2 | 9/2006 | Kadota | |
| 7,104,347 B2 | 9/2006 | Severinsky | |
| 7,104,920 B2 | 9/2006 | Beaty et al. | |
| 7,107,776 B2 | 9/2006 | Ikura et al. | |
| 7,111,704 B2 | 9/2006 | Johnson | |
| 7,135,785 B2 | 11/2006 | Kropp | |
| 7,143,851 B2 | 12/2006 | Masterson | |
| 7,147,072 B2 | 12/2006 | Botti | |
| 7,223,200 B2 | 5/2007 | Kojima | |
| 7,237,634 B2 | 7/2007 | Severinsky | |
| 7,240,749 B2 | 7/2007 | Bhavsar | |
| 7,273,119 B2 | 9/2007 | Tsuneyoshi | |
| 7,275,610 B2 | 10/2007 | Kuang | |
| 7,285,869 B2 | 10/2007 | Syed | |
| 7,301,302 B2 | 11/2007 | Yoshii | |
| 7,306,064 B2 | 12/2007 | Imazu | |
| 7,315,090 B2 | 1/2008 | Yang | |

| | | |
|---|---|---|
| 7,392,871 B2 | 7/2008 | Severinsky |
| 7,407,026 B2 | 8/2008 | Tamor |
| 7,455,134 B2 | 11/2008 | Severinsky et al. |
| 7,469,758 B2 | 12/2008 | Iwanaka |
| 7,469,858 B2 | 12/2008 | Edelson |
| 7,487,852 B2 | 2/2009 | Leone |
| 7,497,198 B2 | 3/2009 | Leone |
| 7,506,711 B2 | 3/2009 | Usoro |
| 7,520,353 B2 | 4/2009 | Severinsky |
| 7,543,454 B2 | 6/2009 | Harris |
| 7,559,388 B2 | 7/2009 | Severinsky |
| 7,600,595 B2 | 10/2009 | Harris |
| 2001/0022245 A1 | 9/2001 | Rogg |
| 2001/0039230 A1 | 11/2001 | Severinsky et al. |
| 2002/0040818 A1 | 4/2002 | Maruyama |
| 2003/0062205 A1 | 4/2003 | Konrad et al. |
| 2003/0162631 A1 | 8/2003 | Williams |
| 2003/0217876 A1 | 11/2003 | Severinsky |
| 2004/0093264 A1 | 5/2004 | Shimizu |
| 2004/0157704 A1 | 8/2004 | Stork et al. |
| 2004/0200648 A1 | 10/2004 | Tarasinski et al. |
| 2004/0207205 A1 | 10/2004 | Kikuchi |
| 2005/0060076 A1 | 3/2005 | Phillips et al. |
| 2005/0060079 A1 | 3/2005 | Phillips et al. |
| 2005/0060080 A1 | 3/2005 | Phillips et al. |
| 2005/0109550 A1 | 5/2005 | Buglione et al. |
| 2005/0113202 A1 | 5/2005 | Miller et al. |
| 2005/0211479 A1 | 9/2005 | Tamor |
| 2005/0224264 A1 | 10/2005 | Perrin |
| 2006/0100057 A1 | 5/2006 | Severinsky |
| 2006/0108161 A1 | 5/2006 | Feliss et al. |
| 2006/0207274 A1 | 9/2006 | Harris |
| 2006/0213704 A1 | 9/2006 | Mack |
| 2006/0231304 A1 | 10/2006 | Severinsky |
| 2006/0231305 A1 | 10/2006 | Severinsky |
| 2006/0231306 A1 | 10/2006 | Severinsky |
| 2006/0237246 A1 | 10/2006 | Severinsky |
| 2006/0237247 A1 | 10/2006 | Severinsky |
| 2006/0258505 A1 | 11/2006 | Vafidis |
| 2007/0030450 A1 | 2/2007 | Liang |
| 2007/0056784 A1 | 3/2007 | Joe |
| 2007/0080005 A1 | 4/2007 | Joe |
| 2007/0107956 A1 | 5/2007 | Matsubara |
| 2007/0107958 A1 | 5/2007 | Oliver |
| 2007/0124037 A1 | 5/2007 | Moran |
| 2007/0169970 A1 | 7/2007 | Kydd |
| 2007/0181355 A1 | 8/2007 | Harris |
| 2007/0246274 A1 | 10/2007 | Dreibholz |
| 2007/0272456 A1 | 11/2007 | Shiiba |
| 2007/0278022 A1 | 12/2007 | Tanishima |
| 2008/0000700 A1 | 1/2008 | Kotani |
| 2008/0006467 A1 | 1/2008 | Morishita |
| 2008/0012535 A1 | 1/2008 | Takatsuji |
| 2008/0029319 A1 | 2/2008 | Fleckner |
| 2008/0029320 A1 | 2/2008 | Fleckner |
| 2008/0076616 A1 | 3/2008 | Kidokoro |
| 2008/0096711 A1 | 4/2008 | Smith |
| 2008/0220933 A1 | 9/2008 | Maeda |
| 2008/0236912 A1 | 10/2008 | Ueoka |
| 2008/0243324 A1 | 10/2008 | Harris |
| 2009/0018716 A1 | 1/2009 | Ambrosio |
| 2009/0024267 A1 | 1/2009 | Kawai |
| 2009/0030568 A1 | 1/2009 | Amano |
| 2009/0095549 A1 | 4/2009 | Dalum et al. |
| 2009/0107744 A1 | 4/2009 | Foersterling |
| 2009/0177345 A1 | 7/2009 | Severinsky |

FOREIGN PATENT DOCUMENTS

| | | |
|---|---|---|
| DE | 19528629 A1 | 2/1997 |
| EP | 1068976 B1 | 1/2001 |
| EP | 1 140 533 | 1/2003 |
| EP | 1140533 | 1/2003 |
| EP | 1297982 | 4/2003 |
| EP | 0 784 743 | 5/2003 |
| EP | 0784743 | 5/2003 |
| JP | 03239631 A | 10/1991 |
| JP | 07-195955 | 8/1995 |
| JP | 11-146502 | 5/1999 |
| JP | 200023301 A | 1/2000 |
| JP | 2004-236609 | 8/2004 |
| JP | 2004-318370 | 11/2004 |
| WO | 2004062957 | 7/2004 |
| WO | 2005003600 | 1/2005 |
| WO | WO2006038968 | 4/2006 |
| WO | WO2006099427 A2 | 9/2006 |
| WO | 2007030069 | 3/2007 |
| WO | WO 2007/097819 | 8/2007 |
| WO | WO2009086135 A2 | 7/2009 |

OTHER PUBLICATIONS

International Search Report dated Mar. 20, 2008, Application No. PCT/US06/60833, 10 pages.

International Search Report and Written Opinion Dated Nov. 5, 2008, Application No. PCT/US2008/072672, 6 pages.

U.S. Army Public Affairs Office, "TARDEC Sponsors Cross-Country Fuel Cell Truck Expedition," RDECOM Magazine, Jul. 2005, p. 6, Aberdeen Proving Ground, MD.

Southwest Research Institute, "Fuel cell-assisted truck completes cross-country trek," http://www.swri.org/9what/releases/2005/fuelcell.htm, May 26, 2005, SwRI, San Antonio, TX.

Brodrick et al, "Demonstration of Proton Exchange Membrane Fuel Cell as an Auxiliary Power Source for Heavy Trucks," SAE Transactions, 2000, vol. 109, Previously Presented 783-788, NY, NY.

International Search Report and Written Opinion, Dec. 6, 2009, PCT/US2009/038938, 12 pages.

European Search Report dated Nov. 23, 2009, Application No. 06850144.4-2207/199439, 6 pages.

Palumbo, Anthony J., et al, Ultracapacitor Based "Hybrid Booster Drive," 20th International Electric Vehicle Symposium and Exposition (EVS 20): Powering Sustainable Transportation, Aug. 2003, revised Jun. 2004, 16 pages.

International Search Report dated Mar. 20, 2008; Application No. PCT/US06/60833.

International Preliminary Report on Patentability dated Mar. 9, 2009, Application No. PCT/US06/60833, 12 pages.

Southwest Research Institute, "Fuel cell-assisted truck completes cross-country trek," May 26, 2005, SwRI, San Antonio, Texas (1 page). [Online], [retrieved on Mar. 6, 2006]. Retrieved from the Internet: <URL:http://www.swri.org/9what/releases/2005/FuelCell.htm>.

U.S. Army Public Affairs Office. "TARDEC Sponsors cross-country fuel cell truck expedition." RDECOM Magazine, Jul. 2005, p. 6. Aberdeen Proving Ground, Maryland.

Brodrick et al. "Demonstration of a Proton Exchange Membrande Fuel Cell as an Auxiliary Power Source for Heavy Trucks." SAE Transactions, 2000, vol. 109, pp. 783-788. New York, NY.

VEHICULAR SWITCHING, INCLUDING SWITCHING TRACTION MODES AND SHIFTING GEARS WHILE IN ELECTRIC TRACTION MODE

RELATED APPLICATIONS

This application claims the benefit of priority to U.S. Provisional Application No. 60/909,748 (Vehicular Switching, Including Switching Traction Modes and Shifting Gears While in Electric Traction Mode), filed on Apr. 3, 2007 and is a Continuation-In-Part of U.S. application Ser. No. 11/558,786 (Electric Traction), filed on Nov. 10, 2006, the entire contents of both applications are incorporated herein by reference.

This application is further related to U.S. Provisional Application No. 60/661,668 (Hydrogen Fuel Cell Powered Cabin Comfort System for Class 7 & 8 Trucks), filed on Mar. 14, 2005; U.S. application Ser. No. 11/374,709 (Fuel Cell-Driven Auxiliary System, and Method Therefor), filed on Mar. 14, 2006; and U.S. Provisional Application No. 60/774,732 (Hybrid Electric Traction Power System for Moving Class 7&8 Tractors By Means of a Drive Motor Attached to the Power Takeoff (PTO) of the Tractor's transmission PTO Connection Point), filed on Feb. 21, 2006; all of which are hereby incorporated herein by reference.

TECHNICAL FIELD

This invention relates to traction vehicles with a normal and an auxiliary traction drives, and more particularly to traction vehicles with electric and internal combustion engine (ICE) drives.

BACKGROUND AND SUMMARY

According to current trends, heavy duty diesel trucks are increasingly subject to legal restrictions, including restrictions regarding emissions and also regarding idling time. In some jurisdictions, legal restrictions may even require outfitting such a truck with controls for detecting idling and automatically shutting down the diesel engine after a certain maximum idling interval, such as five minutes, for example. Inventions disclosed in the related applications address issues arising from these legal restrictions. These inventions provide an improved arrangement for a vehicle, including a vehicle such as a heavy duty diesel engine truck, so the vehicle can be driven via an electric motor. One implication is that an existing, conventional vehicle may be more easily retrofitted for traction and cabin cooling via electric motors. The inventions also provide an improved arrangement for heating and convenience electrical outlets.

The present invention involves a recognition that additional difficulties are presented when alternating between higher and lower speeds, such as on streets and highways. According to one feature of the present invention, a control system enables smooth and safe switching between vehicle operation in ICE traction mode and in ETM mode. The control system detects certain operational states of the vehicle and selectively permits the driver to transfer to the ETM mode responsive to the vehicle operational states satisfying predetermined criteria, wherein in ETM mode the vehicle's traction ICE may be shut off. This may also extend beyond the control system merely granting permission for switching to ETM mode. That is, the control system may notify the driver of the opportunity for ETM mode responsive to detecting the requisite operational states.

In one form of the invention, a computer system includes a processor and a storage device connected to the processor. The storage device has stored thereon a program for controlling the processor. The processor is operative with the program to execute the program for performing a method, in whole or in part, which may include processes for controlling a system such as described herein. In another form of the invention, a computer program product is stored on a tangible, computer readable medium. The computer program product has instructions for executing by a computer system. When executed by the computer the instructions cause the computer to implement processes for controlling a system such as described herein.

Other variations, objects, advantages, and forms of the invention will become apparent upon reading the following detailed description and upon reference to the accompanying drawings. For example, in one form of the invention features described herein are performed as in novel process steps, which may include processes for controlling a system such as described herein.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

The foregoing and other objects, aspects and advantages will be better understood from the following detailed description of a preferred embodiment(s) of the invention with reference to the accompanying drawings. The same reference numbers are used throughout the FIGS. to reference like components and features. In the drawings.

DETAILED DESCRIPTION

In the following detailed description of embodiments of the invention, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Figure 1:
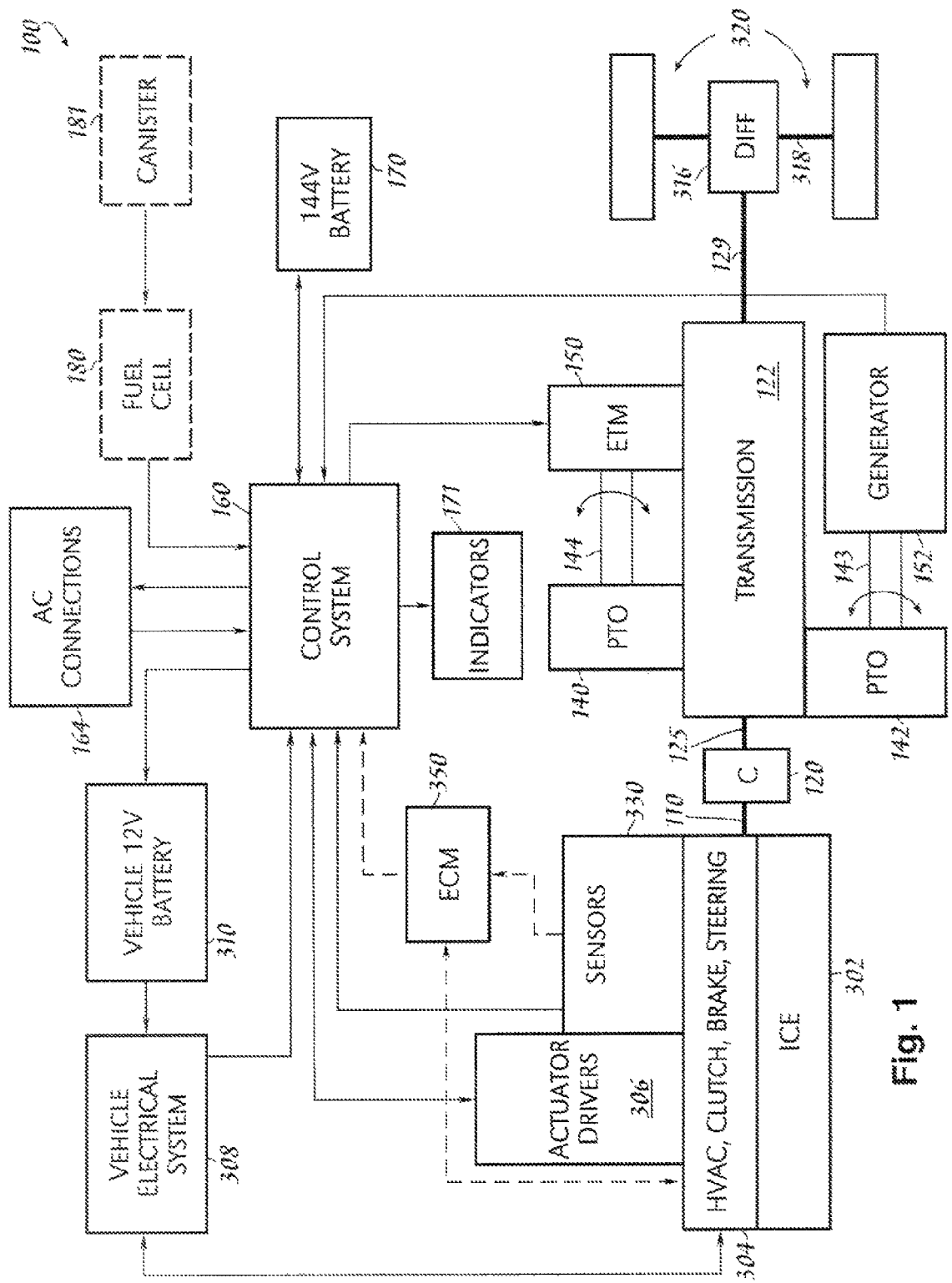
FIG. 1 is a block diagram illustrating aspects of an ETM system for a vehicle, according to various embodiments.

FIG. 1 is a block, diagram of a vehicle 100 having features according to embodiments of a vehicle 100 described herein. Vehicle 100 has an internal combustion engine (ICE) 302 with a crank shaft 10 that delivers rotational torque when the ICE 302 is operating in an ICE mode. Crankshaft 110 is coupled to the input shaft 125 of a standard transmission 122 with a clutch 120 that operates to engage and disengage the ICE from transmission 122. Vehicle 100 also has an electric traction motor (ETM) 150 that is coupled to a transfer gear (not shown) of the input shaft 125 via power take-off (PTO) 140. Many vehicles have a PTO (e.g., 140) with a shaft that is suitable for coupling with the drive shaft of a ETM (e.g., 150). As such, these vehicles are standard and the PTO normally provides a means of extracting power (via the PTO) to operate external devices (e.g., lifts, winches, etc.).

Transmission 122 is directly coupled to differential 316 with transmission output shaft 129. Differential 316 drives one or both wheels 320 with rotating axel(s) 318. Optionally, transmission 122 may be fitted with a second PTO 142 that is also coupled to transfer gear (not shown) of shaft 125 to drive a generator. 152. This may be useful in cases when ETM 150 is not suitable to operate as both a motor and a generator.

Control system 160 contains logic, power distribution switches, drivers, and such that enables the various systems and sub-systems to be controlled to enable vehicle 100 to operate according to embodiments presented herein. The normal vehicle electrical system 308 is coupled to sub-systems of ICE 302, for example, HAC, electric clutches, brake system, steering system, etc 304. In the ICE mode, these sub-systems receive their power in the form of electrical, hydraulic or compressed air in response to electrically activated actuators (e.g., solenoids, relays, etc.). Additional actuator drivers 306 are operated by control system 160 when the vehicle is in the ETM mode of operation and ICE 302 is no longer ON. Control system 160 is an add-on system that has various inputs and outputs that are configured to interface with the sub-systems of vehicle 100. Control system 160 receives auxiliary power from battery 170 whose voltage is suitable for powering an ETM like ETM 150. Control system 160 may also have circuitry that enables it to recharge battery 170 either through AC connections 164 (e.g., standard 120/220 AC voltages) or by converting the alternator output from ICE 302 when in the ICE operation mode. Vehicle battery 310 is the standard (e.g., 12V) battery used to start vehicle 100 in the ICE mode of operation. Battery 310 may also be charged via control system 160 from power supplied from AC connections 164, battery 170 or via optional generator 152. Control system 160 receives signals from sensors 330 which may include standard sensors used in the ICE operation mode and additional sensors added to facilitate operation in the ETM operation mode. For example, sensors may be added so the rotational speed of input shaft 125 and output shaft 129 may be determined. These sensors are assumed to be included in sensors 330 even though the aforementioned sensors are not shown in FIG. 1.

Control system 160 has circuitry that allows variable power to be applied to ETM 150 to adjust its rotational speed while under load. Likewise, control system 160 may also have circuitry that allows the output of ETM 150 to be used as a charging voltage in the case when ETM 150 is suitable to operate as both a motor and a generator. This circuitry may be configured to allow variable loads to be applied to the output of ETM 150 when it operates as a generator (e.g., during braking) to recover kinetic energy from vehicle 100. Control system 160 is further coupled to indicators 171 which contains displays and circuitry configured to receive sensor signals and process these signals to generate parameters (e.g., speed of shifting gears and shaft speeds) that may be presented to a driver to aid in shifting gears of transmission 122 in the ETM operation mode when ETM 150 is engaged to the transmission shaft 125 via PTO 140.

Battery 170, optional fuel cell 180 and its canister 181 fuel supply, AC connections 164, various sensors, etc., and control system 160 may be considered part of an auxiliary power system that is an added along with ETM 150 to enable vehicle 100 to operate with independent traction wheel drivers; ICE 302 and ETM 150. Therefore, any standard vehicle having a PTO 140 or having a port that may accept a PTO 140 may be retrofitted with an auxiliary power system and an ETM 150 to enable the ETM operation mode as described herein.

Vehicle 100 also has a conventional 12 VDC battery 310 for supplying conventional electrical system 308 for ignition, lights, etc. In one embodiment, the auxiliary power system includes a battery based power source, e.g., 144 VDC batteries 170. The battery voltage may vary in other embodiments and is primarily limited by safety and cost considerations. A higher voltage is advantageous because it delivers a given amount of power at a lower current. Thus vehicle 100 has two traction drive systems for drive wheels 320, ETM 150 that operates in an ETM system mode and ICE 302 that operates in an ICE system mode.

In one embodiment, ETM 150 is a direct,current motor (DC) that is mechanically coupled through power take off (PTO) 140 to drive transmission 122. This embodiment also includes an alternating current (AC) generator (alternator) 152 that is driven by transmission 122 via a second PTO 142. In this case, AC alternator 152 generates an electrical output that is coupled to control system 160 when ICE 302 is providing power to transmission 122. In the ICE mode, alternator 152 is thus operable to recharge battery 170 through control system 160 when ICE 302 is running and clutch 120 couples crankshaft 110 to transmission input shaft 125.

As previously stated, the ETM 150 shaft is mechanically engaged to the transmission input via the PTO gear assembly 140. In the embodiment in which the ETM is a DC motor 150, PTO 140 includes a PTO clutch mechanism (not shown) for disengaging the ETM 150 during ICE operation.

In another embodiment, ETM 150 is an AC motor that it is operable to generate electricity when engine 302 is reversed during braking and clutch 120 engages crankshaft 110 to transmission input shaft 125. When operating in a generating mode during braking, an AC ETM 150 may be used to charges batteries 170 via control system 160.

In one embodiment, vehicle 100 transmission 122 is a conventional manual transmission wherein manual clutch 120 is operable to disengage ICE 302 from the transmission 122. ETM 150 independently supplies traction power for vehicle 100 via PTO 140 added to a port of manual transmission 122 and coupled to a transfer gear of transmission 122 input shaft 125. ETM 150 preferably supplies traction power only when conventional ICE 302 is disengaged from transmission 122 via clutch 120, and enables shutting down ICE 302 to conserve energy.

In one embodiment, an auxiliary power system, added to vehicle 100, employs a battery 170 as the source of stored power for ETM 150. Thus in the ETM mode of operation, ETM 150 is operable to receive energy from battery 170 and independently and even exclusively supplies traction power for vehicle 100. In the case where no means are provided for recharging battery 170, the range, speed and load handling ability of vehicle 100 in the ETM mode of operation are limited by capabilities of the electric motor 150 and the stored energy provided by an externally charged battery 170.

In another embodiment, battery 170, and motor 150 are selected to be of such limited sizes and limited capabilities that they also limit the ability of vehicle 100 to handle even conventional loads in certain ordinarily encountered circumstances; this trade-off is implemented in order for the added motor 150 and battery 170 to satisfy certain cost, size, and weight constraints.

The horsepower rating of ETM 150 may vary from one embodiment of the invention to the next, depending on the load that needs to be serviced and on the speed and acceleration requirements for vehicle 100. If vehicle 100 is configured as a fully loaded heavy duty, tractor-trailer truck, it may weigh as much as 80,000 pounds. Conventional electric vehicles of around 1800 pounds that operate only on electric power require an electric motor of about 50 HP to achieve and maintain an 80 MPH vehicle speed. In one embodiment, ETM 150 is of a DC type motor that weighs about 180 pounds and is rated at 40 horse power (HP) in continuous operation and 80 HP for up to two minutes in intermittent operation. In another embodiment, ETM 150 is an AC motor that has a similar HP rating and weight. The kilowatt hour (KWH) capacity of battery 170 may also vary from one embodiment to the next. For example, in one embodiment, battery 170 is a Lithium Ion type battery that has an energy density of approximately 150 WH/Kg, therefore a 30 KWH capacity Lithium Ion battery capable of driving a 40 HP ETM 150 for one hour would require a battery 170 that weighs approximately 200 KG or 500 pounds. Of course, the KWH ratings and corresponding weights for an ETM 150 and a battery 170 would depend upon vehicle 100 weight, load, operational, and economic objectives. In some embodiments, the ratings and corresponding weights of motor 150 and battery 170 may be less than in the stated example above even for use in a 80,000 pound tractor-trailer vehicle 100. In some embodiments, the rating may be more.

In embodiments that intentionally limit the size of electric traction motor 150 and corresponding battery 170, operational demands that require higher speed driving or driving up a grade may give rise to a need to alternate between the ETM mode and ICE mode rather more frequently than would be necessary for slow speed driving and idling. Also, where operational demands include higher speed driving, the switching between the ETM and the ICE operation modes may need to occur while the vehicle is moving. An arrangement is described above in which clutch 120 disengages ICE 302 from manual transmission 122 during ETM operation and ETM 150 is always coupled to transmission 122 via PTO 140. It should be further appreciated that this arrangement, which is used in certain embodiments, is particularly non-obvious, since this arrangement prevents the use of clutch 120 for shifting among the gears of transmission 122.

Figure 5:
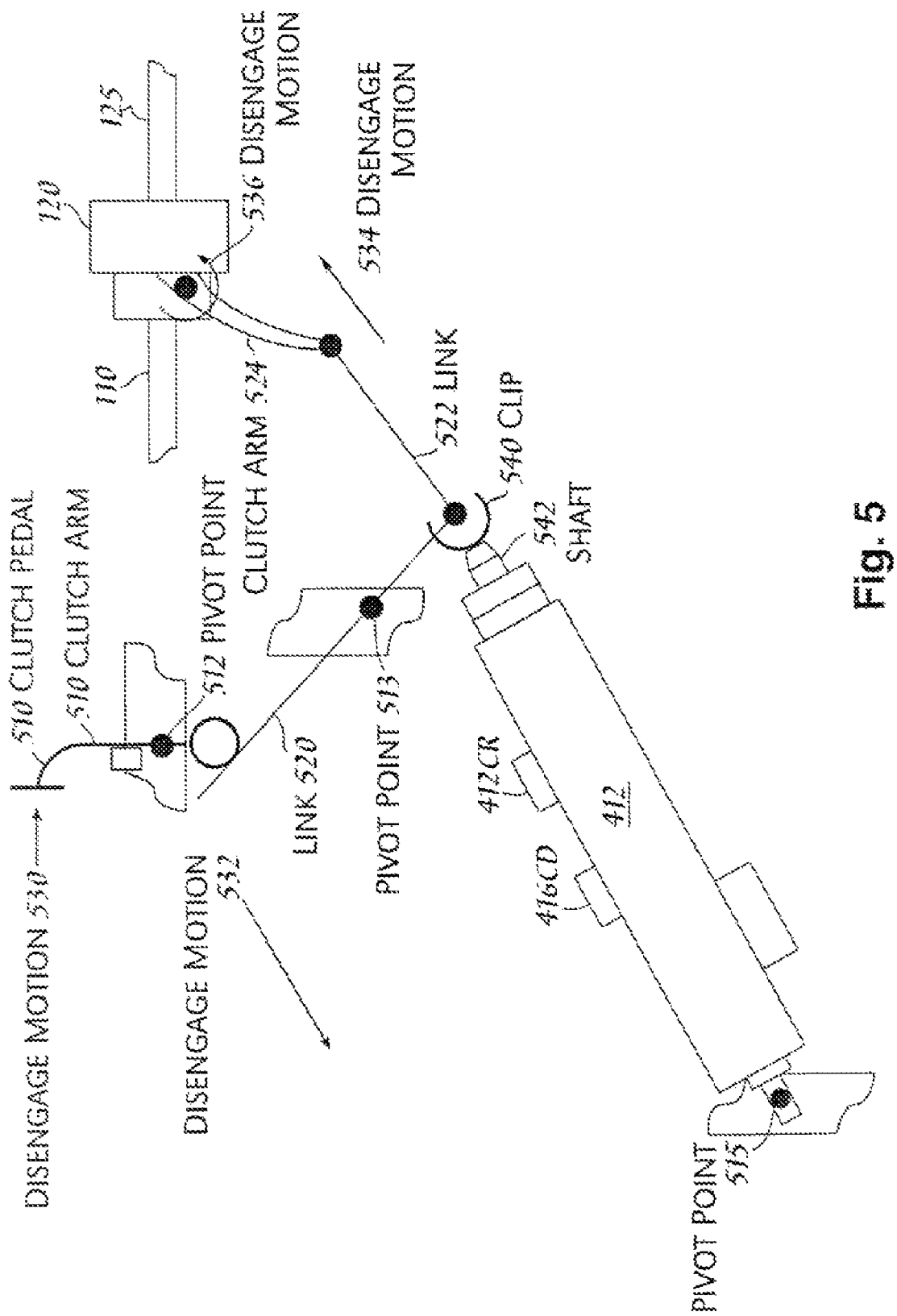
FIG. 5 illustrates an embodiment where the manual clutch pedal is held by an actuator in the ETM mode of operation.

FIG. 5 illustrates details of an arrangement that may be used to hold clutch 120 depressed when disengaging ICE 302 from transmission 120 during ETM operation. An electrically operated actuator 412 (e.g., a solenoid) is added to vehicle 100 and is operated by signals from control system, 160 to hold clutch 120 in a position that disengages ICE 302 from transmission 122. When an operator depresses clutch pedal 510 with disengage motion 530, clutch arm 514 operates around pivot point 512 to drive link 420 with disengage motion 532. When link 520 rotates around pivot point 513, joint 538 transfers motion to link 522 that drives disengage motion 534 that moves clutch arm 524, that in turn, generates disengage motion 536 in clutch 120 isolating shaft 110 from transmission input shaft 125.

Actuator 412 has a cup 540 that is operable to engage joint 538 and to hold it at the engaged position. When clutch pedal 510 is depressed, joint 538 moves as indicated by disengage motion 534 away from cup 540. When clutch pedal 510 is released, it returns to its initial position. However, if actuator 412 is signaled (ETM mode) to engage joint 538 when clutch pedal 510 is depressed, then shaft 542 extends and engages joint 538 preventing it from returning to its home initial position and thus clutch pedal 510 will remain depressed. In this manner, an operator may depress clutch pedal and select the ETM mode to hold the ICE disengaged from transmission 122.

According to one embodiment, actuator 412 and its associated linkage are added to the conventional linkage described in the paragraph above as follows. Actuator 412 is rotatably secured at one end to the chassis of the vehicle at pivot point 516. An extendable/retractable shaft 542 of actuator 412 is secured by cup 540 to joint 538 of link 520 and 522, such that links 520 and 522 have sufficient freedom of movement to allow conventional operation by foot pedal 510 while still enabling actuator 412 shaft 542 to also transmit disengage motion 534 to link 522 by driving shaft 542 toward its fully extended position. Limit switches 416CR and 416CD may be mounted on actuator 412 to sense the extreme positions of shaft 542 and send corresponding shaft position signals to control system 160.

Drivers of heavy duty diesel trucks are accustomed to regulating an ICE of a conventional vehicle to thereby avoid excessively high ICE rotational speeds, e.g., reaching engine "red line" revolution per minute (RPM) limits. When accelerating such a vehicle, an experienced driver is able to recognize when the ICE's RPM speed has begun to approach an upper red line limit merely by the audible sound the ICE makes, without actually having to use a tachometer. When the ICE rotational speed nears the upper red line limit, the driver may switch the transmission to a higher gear. To do this operation, at least sometimes requires temporarily disconnecting the ICE from driving the wheels of the vehicle by disengaging the clutch. As a result, the ICE rotational speed is allowed to coast down to match, i.e., synchronize to, the initial rotational speed of the transmission input corresponding to a next higher gear. An experienced driver typically is attuned to the interaction of the ICE and the transmission at various speeds when slowing down the vehicle, such as for traffic, such that the driver may not only apply the brakes but may also downshift the transmission so that the ICE contributes to braking. Thus the ICE rotational speed regulation is facilitated by the vehicle clutch.

According to one embodiment, the vehicle's clutch 120 operates such that ICE 302 does not rotate at all once vehicle 100 is fully engaged in ETM mode. Once control system 160 signals switching to the ETM mode, the vehicle's clutch pedal 510 is held in by a clutch actuator 412 in the depressed position and thus ICE, 302 is disengaged from transmission 122 and from driving vehicle wheels 320. Consequently, excessively high ICE 302 rotational speed is not an issue when operating in ETM mode.

However, ETM operation presents other problems for a heavy vehicle 100 where the ETM 150 is coupled to a conventional transmission 122 via a PTO 140 According to an embodiment in which ETM 150 and PTO 140 have no clutch, motor 150 shaft is mechanically engaged to transmission 122 input via a gear in PTO 140. In this embodiment, the shaft of ETM 150 drives vehicle wheels 320 regardless of whether vehicle 100 is operating in ICE mode or ETM mode, unless of course transmission 122 is shifted to neutral.

Various embodiments include a variety of alternative configurations in addition to the AC and DC traction motor alternatives. A battery supplying power for the ETM mode of operation may or may not be supplemented by a fuel cell. A generator for recharging the battery may or may not be provided independently of ETM 150. In the embodiment where ETM 150 is a DC motor, a separate AC alternator 152 may be mechanically engaged to the transmission input via a second PTO 142 coupled to the same transmission transfer gear as ETM 150. AC alternator 152 may thus be electrically coupled to charge battery 144 via a control system 160 when the vehicle 100 is in ICE mode. The vehicle 100 may or may not include independently operable cabin comfort features, such as cooling, heating and convenience outlets that are powered by the auxiliary power source, e.g., battery 170.

Regardless of whether the ETM 150 is an AC or DC motor, special arrangements concerning control, monitoring, mode switching, and shifting are needed to accommodate embodiments in which ETM 150 is mechanically engaged to manual transmission 122 via a PTO 140 coupled to a transmission input 125.

Figure 6:
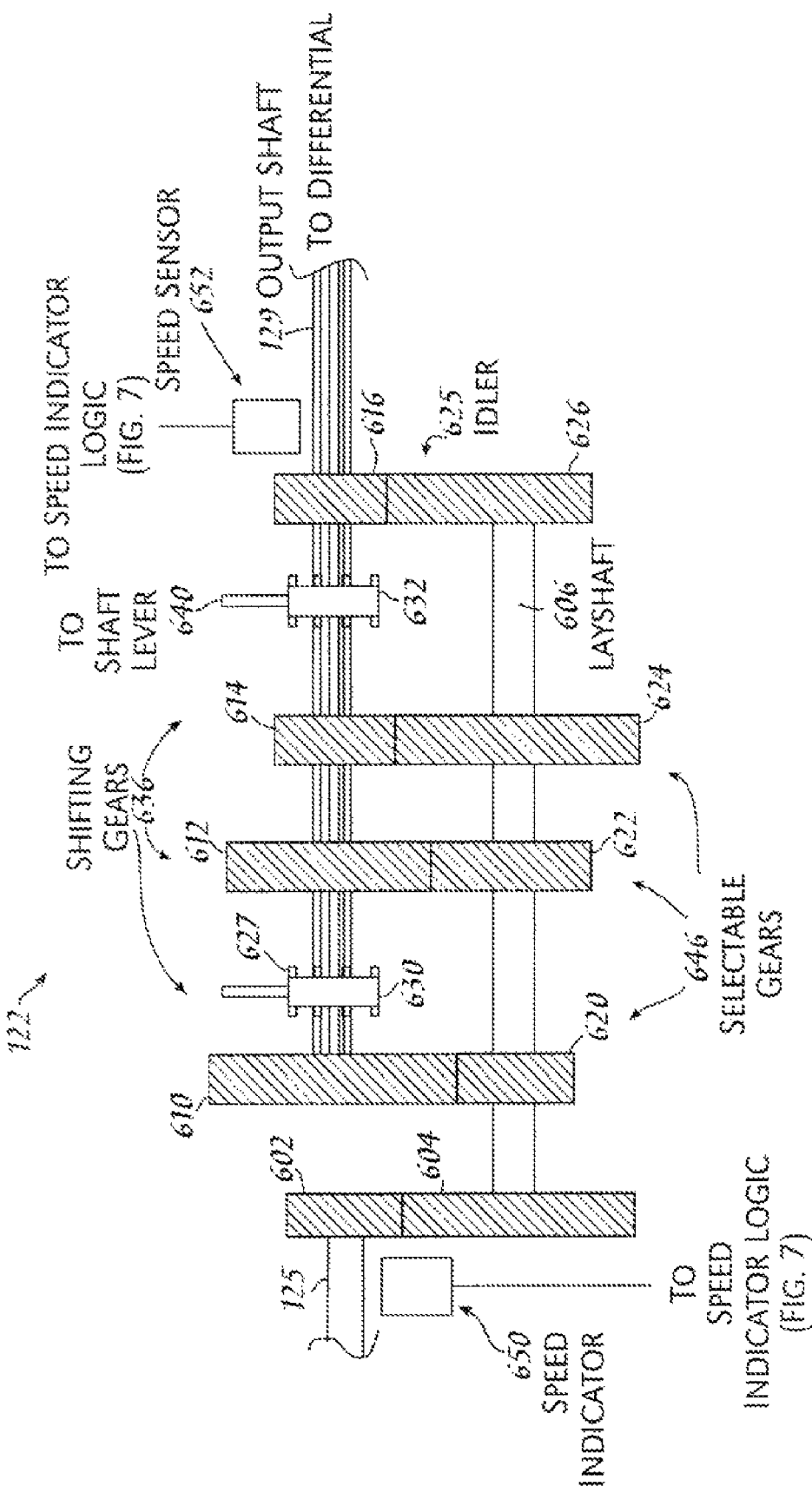
FIG. 6 illustrates the relationships between gear sets in a simplified manual transmission having speed sensors on the transmission input and output shafts.

FIG. 6 illustrates a standard 3 speed transmission 122 that is used to simplify an explanation of how embodiments herein operate. (It should be appreciated that a conventional HD vehicle will have more gears.) Input shaft 125 is coupled to the ICE via a clutch(not shown). ETM 150 is coupled to a transfer gear on input shaft 125 via power take-off 140. When the ETM mode is selected, ICE 302 is disengaged from the input shaft 125 by the clutch while ETM 150 remains directly coupled.

If ETM 150 is powered, then it rotates input shaft 125 and the rotational speed of shaft 125 is sensed via speed sensor 650. Given the known speed of shaft 125 and known gear ratios, including the those of the transfer gear of transmission 122 and the gears of power take-off 140, the specific rotational speed of ETM 150 may be determined as output speed=input speed×net gear ratio. Gear 602 is rigidly coupled to input shaft 125 and transfers the rotation of input shaft 125 via gear 604 to lay shaft 606. Gears 620, 622, 624 and 625 are all rigidly coupled to layshaft 606 and all rotate together at the rotational speed of layshaft 606. Gears 620, 622, 624 and 625 all have different diameters and thus offer the potential of different gear ratios when engaged to rotate another gear. Gear 626 is coupled through an idler gear 625 to gear 616 and serves to provide a reverse gear for the vehicle.

Output shaft 129 is connected to drive the vehicle road wheels through differential 316 (see FIG. 1) and thus rotates in a fixed relation to the road wheels. Output shaft 129 is splined and is directly coupled to shift collars 630 and 632. Shift collars 630 and 632 are configured to move laterally while rotating at the same rotational speed as output shaft 129. Shifting gears 610, 612, 614, and 616(also referred to herein as shifting gears 636) are always engaged with their corresponding layshaft gears 620, 622, 624, and 626 (also referred to herein as layshaft gears 646) and have bearings that allow them to rotate freely on output shaft 129. Shifting collars 630 and 632 are coupled to a shift lever (not shown) that is operable to move shifting collars 630 and 632 by respective shift linkages, one of which is depicted herein as shift linkage (or "rod") 640. With the shifting collars 630 and 632 positioned as shown, transmission 122 is in "neutral." In this neutral state, if input shaft 125 is being rotated by ETM 150, then all the shifting gears 610, etc. and layshaft gears 620, etc. are rotating while output shaft 129 remains stationary (if the vehicle road wheels are also stationary). That is, with the shift lever in the neutral position, shifting collars 630 and 632 are not engaged with any of shifting gears 610, etc., so that shifting gears 610, etc. rotate responsive, to the rotation of ETS motor 150 and not the road wheels, while shifting collars 630 and 632 rotate responsive to rotation of road wheels and not the rotation of ETS motor 150.

Shifting collars 630 and 632 have "dog teeth" (e.g., 627) and all of the shifting gears 610, 612, 614, and 616 have mating "holes" for engaging with the dog teeth. Shifting collars 630 and 632 are free to slide along shaft 129 responsive to movement of the shift lever in order to move into a position so that one of the collars 630 or 632 engages one of the shifting gears 610, etc. But shifting collars 630 and 632 are constrained to rotate with shaft 129 by splines of collars 630 and 632 that engage splines of shaft 129. Shifting gears 610, etc. have bearings permitting them to freely rotate on output shaft 129. However, when a shifting collar 630 or 632 is in engagement with a shifting gear (e.g., 612), the shifting gear is able to drive the vehicle wheels through the splines coupling the shifting collar to drive the output shaft 129. The rotational speed of output shaft 129 is determined by the gear ratio of the shifting gear (e.g., 612) and the corresponding layshaft gear (in this example, gear 622). Therefore, if gear 610 is selected, output shaft 129 rotates the slowest for a given ETM 150 rotational speed because layshaft gear 620 is the smaller than 622 or 624 and shifting gear 610 is larger than 612 or 614.

For a given ETM 150 rotational speed, there is a specific output shaft rotational speed that corresponds to which shifting gear (610, 612, of 614) that is engaged with either shift collar 630 or 632. When shifting gears, switching between shifting gears 610, 612, or 614 the output shaft rotational speed needs to be matched to the corresponding "shifting to" gear. Remember, in neutral and with ETM 150 driving input shaft 125 all the non-selected shifting gears 610, etc. are rotating freely on output shaft 129 at a rotational speed determined by ETM 150 rotational speed and their particular gear ratio. With transmission 122 in neutral, shifting collars 630 and 632 rotate at the speed of output shaft 129, which is directly related to the vehicle speed because the road wheels are turning shaft 129.

If the rotational speed of output shaft 129 is not matched to a next gear 610, etc. being "shifted to," then dog teeth 630, etc. and the matching holes in the next gear 610, etc. will "clash," producing what is known as "gear clash." (Note that the gear teeth of shifting gears 610, etc. and corresponding layshaft gears 620, etc. do not actually clash, since all are in constant engagement.)

Therefore, the problem of shifting gears is that the shifting collars 630 and 632 rotate at the same speed as the output shaft 129 and the shifting gears (on the output shaft) rotate at a speed determined by the input shaft speed and the particular gear ratio between layshaft gears 620, etc. and shifting gears 610, etc.

In one exemplary embodiment operating In the ETM mode, the ETM 150 is always engaged to the transfer gear in the PTO 140. Matching the rotation of the output shaft 129 (vehicle speed) to a shifted to next gear 610, etc. (ETM speed) requires speed adjustment of these elements.

UP-Speed Shifting:

UP-speed shifting normally occurs during vehicle acceleration. A lower gear is first selected which requires the ETM 150 to operate at a high revolution per minute (RPM) to achieve a given vehicle speed. To shift to a next higher gear requires the transmission to go through neutral. Vehicle inertia will maintain a relatively constant forward speed during this time depending on grade and drag. The driver at this time will remove drive from the ETM, which will cause the ETM to slow down depending on loading applied through its coupling to the transfer gear. When the driver determines the speed of the output shaft 129 (vehicle speed) is matched to the next higher shifting gear (ETM rotational speed), then shifting may be initiated while minimizing clash. The ETM rotational speed may be further adjusted by switching the ETM into a generator mode and loading its output (e.g., charge a storage battery) to reduce ETM 150 speed.

Down-Shifting:

Down shifting normally occurs when the driver is coming to a stop or slowing due to traffic conditions or the vehicle load and grade requires shifting to a lower shifting gear to produce added torque. In this case, a higher shifting gear is already engaged and the driver needs to shift to a lower shifting gear. Depending on which higher gear is presently engaged to the output shaft, the next lower gear options will vary.

In down-shifting to increase torque, the driver does not want to slow the vehicle speed in order to reduce the required ETM speed needed for the next lower gear. In this case, the driver is trying to maintain vehicle speed but to do so requires additional torque. When down-shifting to slow the vehicle speed or for stopping, the driver wants to slow the vehicle speed and may do so by a combination of braking and sequentially shifting to lower gears. Braking reduces the required ETM speed for a next sequential lower gear, and when engaged switching the ETM to a generator mode will further reduce vehicle speed while reclaiming some of the vehicle's kinetic energy.

In at least some embodiments, the ETM mode is "clutch free" to reduce equipment costs and to optimize the ability to recover vehicle kinetic energy during down-shifting and breaking. Shifting a manual transmission without a clutch to disengage the ETM, may be improved by the use of synchronizers built into the shifting collars (e.g., 630 and 632). Synchronizers are configured to first engage the shifting collar to a next gear with a frictional drive that serves to match the rotational speed of the output shaft with the ETM rotational speed (shifting gear) through frictional losses before rigidly engaging the dog teeth (e.g., 627) to lock the output shaft 129 to the corresponding next shifting gear (e.g., 610, 612, and 614). While this would enhance the ability of the driver to shift gears, it comes at increased costs and lower efficiency.

Gears 620 and 610, which are always engaged, represent a gear ratio corresponding to a "low" or "first" gear. Likewise, gears 622 and 612 form the gear ratio of second gear and gears 624 and 614 form the gear ratio of the third or high gear. As stated before, gears 620, 622, 624 and 625 are coupled to layshaft 606 and thus rotate at a speed proportional to the ETM 150 determined by the gear ratio of gears 602 and 604.

If gear 610 is engaged to drive output shaft 129, then gear 620 makes more revolutions per unit time than its corresponding bigger gear 610. Thus ETM 150 must rotate faster for a given vehicle speed, which corresponds to a lower gear. Gear 622 is larger than gear 620 and therefore if gear 612 is engaged to drive output shaft 129, then gear 622 also makes more revolutions per unit time than its corresponding bigger gear 612. However, since gear 622 is bigger than 620, ETM 150 does not have to rotate as fast for a give vehicle speed as when gear 610 is engaged to drive transmission output shaft 129, thus the combination of 622 and 612 produce a higher gear (e.g., second gear) than gears 620 and 610. Finally, if gear 614 is engaged to drive the transmission output shaft 129, then the high gear combination of gears 624 and 614 require ETM 150 to rotate the slowest for a give vehicle speed.

When shift collar 632 engages gear 616, the output shaft 129 is driven by the gear 626 and 616 through idler gear 625. Idler gear 625 is not driven by any power shaft and serves only to reverse the rotation direction of gear 626. Typically reverse represents the lowest gearing ratio, however in this view the ratio of the gears 626 and 616 may not be to scale relative to producing a typical reverse gear ratio.

In the following, a particular gear ratio is represented as the ratio of the ETM 150 driven gear to the gear driving the output shaft, e.g., 620/610 represents first (low) gear, 622/612 represents second gear, 624/614 represents third (high) gear and 626/616 represents the reverse gear. Shifting collar 630 engages gear 610 to provide first gear drive to transmission output shaft 129 and gear 612 to provide second gear drive. Likewise, shifting collar 632 engages gears 614 and 616 to provide third gear and reverse, respectively.

According to one embodiment, the energy of the auxiliary power source available to power ETM 150 is limited. For example, stored electrical power requires expensive and heavy batteries, so in an embodiment a limited source of electrical energy is available on-board. Correspondingly, in an embodiment, ETM 150 may not have sufficient horsepower capacity to power all loads that a heavy duty vehicle may encounter unless a relatively low gear ratio (e.g., 620/612) is engaged. Thus, it is also an objective for the driver to 'select a particular gear (610, 612, or 622) that provides sufficient mechanical advantage.

If the truck is empty and the grade is flat, then the truck may operate at a higher gear ratio (e.g., 624/614) without overloading the ETM 150. In this case, even though the higher gear ratio 624/614 provides less mechanical advantage, the lower weight and grade require less torque. If the truck is loaded with more weight or the grade is steeper, then the ETM 150 requires greater mechanical advantage via the transmission 122 to deliver enough torque to the output shaft 129 of the transmission and may require selecting a lower gear ratio (e.g., first gear 620/610).

Figure 3:
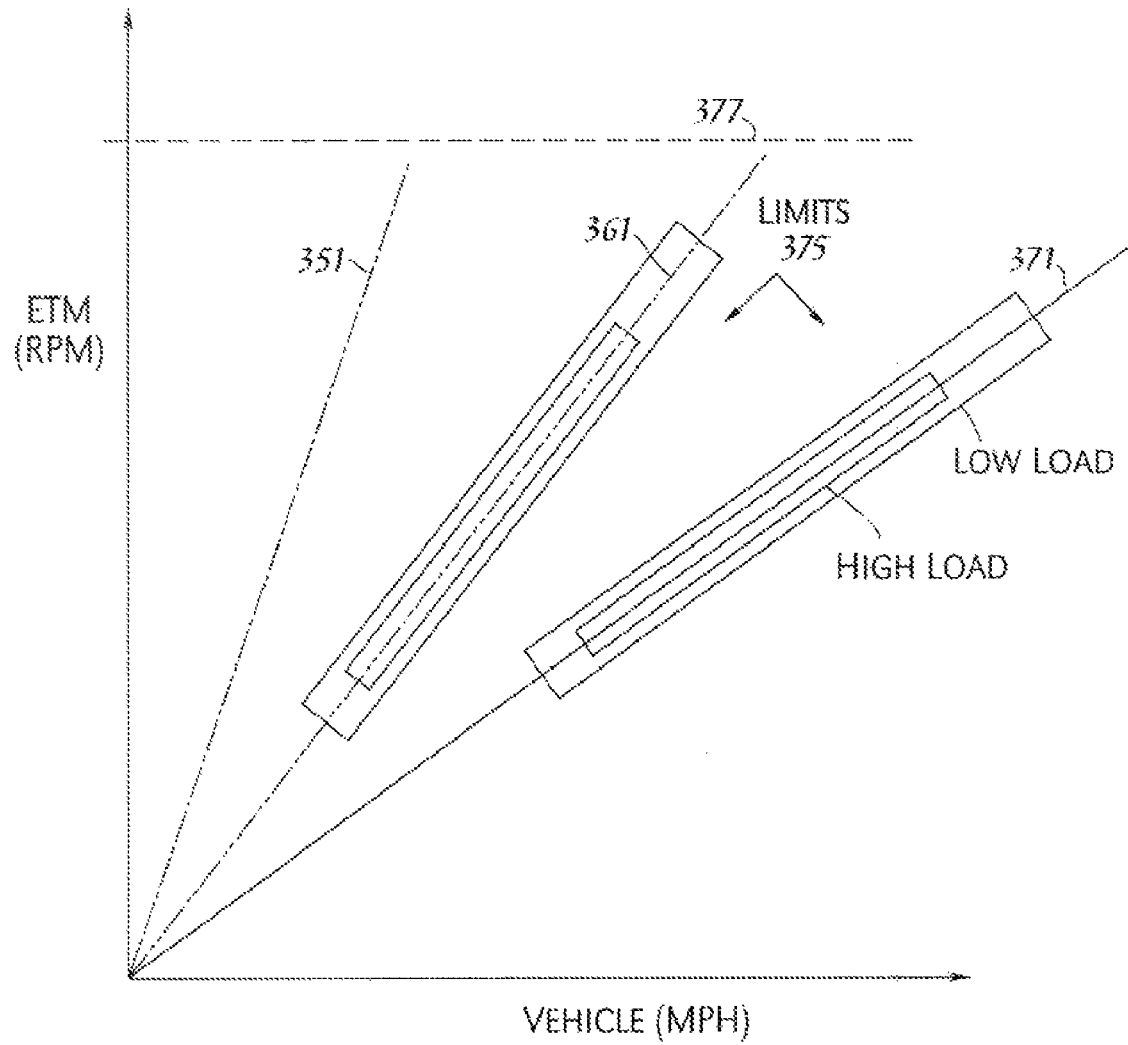
FIG. 3 is a graph illustrating relationships between ETM rotational speed, vehicle speed, and torque limits while various drive gears are engaged.

FIG. 3 is a graph of relationships among vehicle speed, i.e., road wheel rotation, gear selection, and ETM rotational speed. Locus 351 illustrates vehicle speed versus ETM rotational speed in the case where the transmission first gear (shifting gear 610, FIG. 6) is engaged. Locus 361 illustrates vehicle speed versus ETM rotational speed with the transmission second gear (gear 612, FIG. 6) engaged. Locus 371 illustrates vehicle speed versus ETM rotational speed with the transmission third gear (gear 614, FIG. 6) engaged. FIG. 3 also shows an upper rotational speed limit 377, which may correspond to a speed limit for PTO 140 or transmission 122 of FIG. 1 or to a breakdown-torque speed for ETM 150. Also shown are limits 375 for ETM 150 with the third gear (gear 614 FIG. 6) of the transmission engaged. Limits 375 indicate a range of speeds for which the ETM is capable of delivering sufficient acceleration when engaged to the drive wheels via third gear. The range is a function of weight of the loaded vehicle and the road grade on which it is traveling, as shown. A similar sets of limits 375 apply for locus 361 where the second gear (gear 612, FIG. 6) is engaged. In the illustrated embodiment of the invention, ETM 150 is capable of delivering sufficient acceleration throughout the range of speeds for the case where the first gear (gear 610, FIG. 6) is engaged, up to the rotational speed limit 377. Note that in FIG. 3 the location or shapes of 351, 361, 371, 375 and 377 are not necessarily to scale and are only illustrative of general location or shape.

Figure 2:
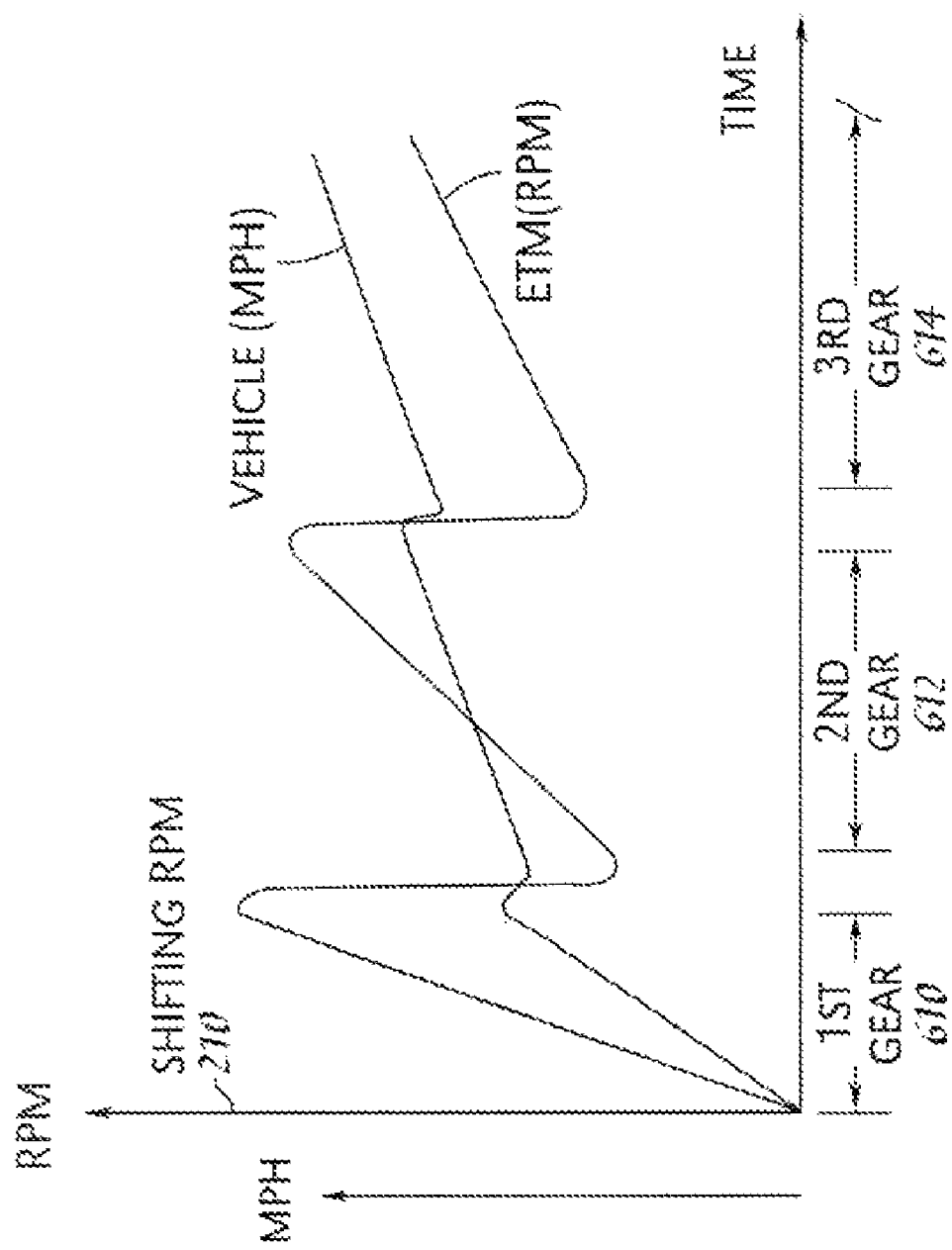
FIG. 2 illustrates a relation between vehicle speed and ETM rotational speed in the ETM mode as a vehicle is accelerated and gears are shifted over time from first gear to second gear to third gear.

FIG. 2 illustrates the relationship between vehicle speed and ETM rotational speed in the ETM mode as the vehicle is accelerated and gears are shifted over time from the first gear to the second gear, and then from the second gear to the third gear. According to the illustrated embodiment, the gear ratios of the three depicted selectable transmission gears 646 (FIG. 6) are such that the gears are shifted each time the ETM rotation speed substantially matches a corresponding gear speed, i.e., the RPM marked "shifting rpm" 210 in the graph.

The consistent shifting rpm 210 of the ETM at each shifting point, as depicted in FIG. 2, illustrates why a measure of current ETM rotational speed presented to the driver is often sufficient to enable the driver to adjust the ETM rotational speed to match a vehicle speed and a selected gear when shifting gears while accelerating. However, when downshifting, it is a bit harder to match ETM rotational speed (layshaft gears 646) to a vehicle speed corresponding to shifting gears 636 even where gear ratios are designed to provide the illustrated repeatability.

For example, in traffic a vehicle often has to be slowed after accelerating with a high gear 636 engaged to the output shaft 129. Then, after slowing, the vehicle may need to be re-accelerated, which may require down shifting to a lower gear ratio by engaging one of gears 636 (e.g., 610) with shifting collar 630 to provide greater mechanical advantage. It would most likely be coincidental for the vehicle speed to have slowed such that the ETM rotational speed matches shifting rpm 210 shown in the graph. Therefore, in traffic, the driver may need to shift to neutral and adjust ETM speed when confronted with a condition that requires acceleration, de-acceleration and then acceleration. This condition corresponds to "hunting" for the right gear 636 to engage and the right ETM 150 rotational speed.

Figure 4:
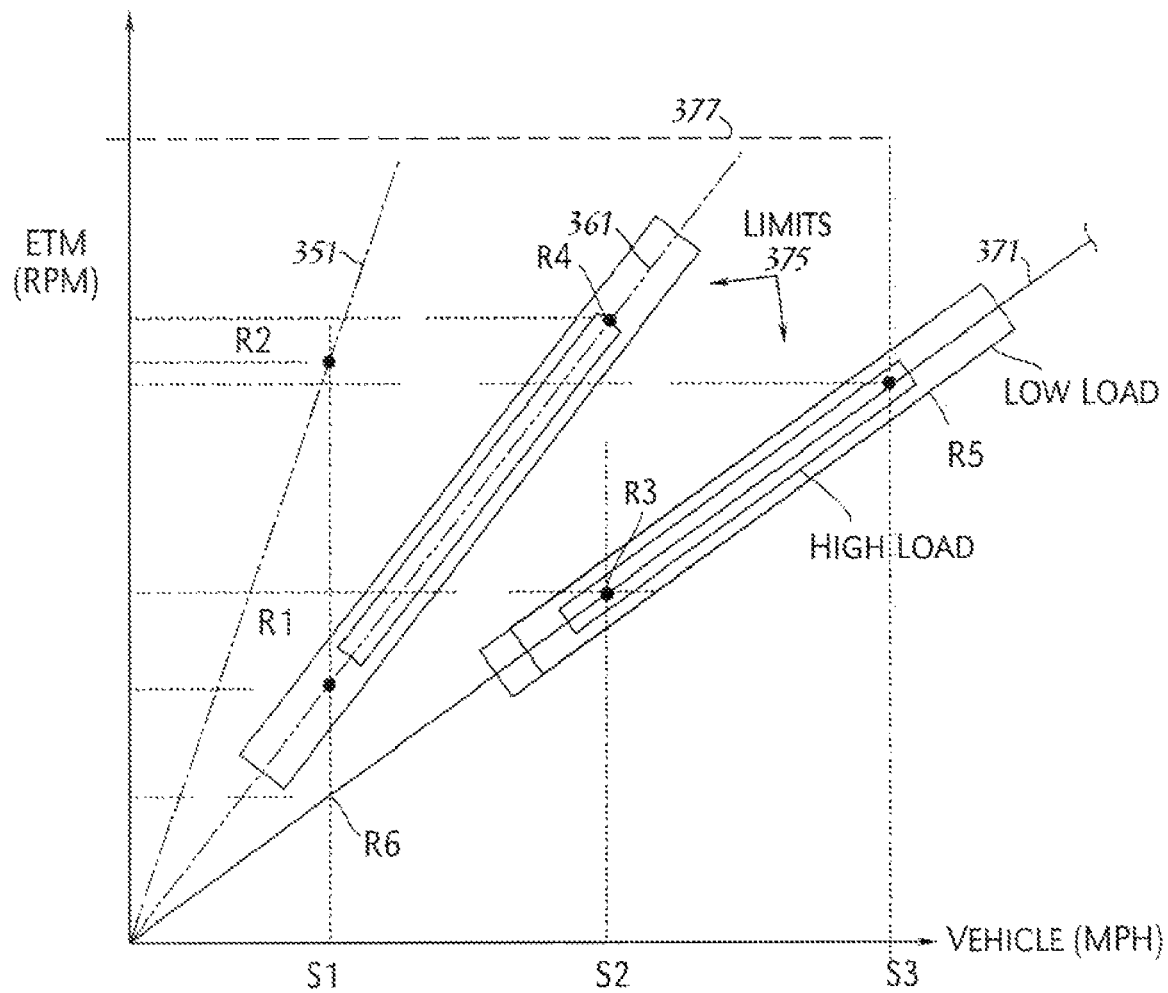
FIG. 4 is a graph illustrating relationships between ETM rotational speed and vehicle when shifting between gears according to various embodiments.

FIG. 4 illustrates the correspondence between vehicle speed, gear speed and ETM rotational speed. FIG. 4 is used to illustrate the above mentioned complication that arises when trying to synchronizing rotational speeds when down shifting. The shapes or locations of 351, 361, 371, 375 and 377 in FIG. 4 are not necessarily shown to scale.

Suppose the driver accelerated to speed S3 (ETM rotational speed R6) by sequentially shifting until reaching third gear 614 (FIG. 6) and then was required to slow down. Assume the driver slowed the vehicle by braking to speed S2 and then decided to again accelerate the vehicle. At this point, the third gear 614 is still engaged and the vehicle is operating on locus 371 where the vehicle speed is S2 and the ETM rotational speed corresponds to R3. The driver has the option of remaining in third gear and operating along locus 371 or shifting to second gear 612 and operating on curve 361. However, if the driver chooses to shift gears, the only option is to shift to second gear 612, since operation in first gear would exceed limit 377. This would require adjusting the ETM rotational speed to R4 to avoid gear clashing. From only a vehicle speed perspective, both second gear 612 and third gear 614 may be used with the appropriate ETM rotational speed to correspond to the current speed S2 for the vehicle. However, since 361 and 371 represent considerably different relative torque capabilities, the appropriate gear chosen would need to be determined by torque requirements of the current loaded vehicle. That is, the torque requirements of the current loaded vehicle in the current operating circumstance and its acceleration demands would need to be best matched to the torque that the ETM is capable of delivering with those gears 612 or 614 engaged.

It is important to note that the difference between ETM rotational speed R3 and R4 is significant. Therefore, the driver would need to have a "feel" for this difference in order to adjust the ETM rotational speed in order to avoid clashing gears when he selects a gear to re-engage upon resuming accelerating at road wheel speed S2.

In another example, assume the driver had slowed the vehicle by braking to speed S1 while in third gear before deciding to once again accelerate. This would mean that while the vehicle speed slowed to S1, the rotational speed of the ETM would slow from R6 to R5. The driver could remain in third gear (i.e., operate along locus 371), or shift gears. To shift to second gear, the driver would have to go to neutral and then adjust the ETM rotational speed close to R1. To shift to first gear, the driver would have to go to neutral and then adjust the ETM rotational speed close to R2 which is considerably higher than R1. All three gears may allow operation corresponding to speed S1 for the vehicle since the respective gears' limits 375 for acceptable acceleration and the upper rotational speed limit 377 are not exceeded. However, first gear 610 may not be a good choice, since the required rotational speed R3 for the ETM is already so near to upper speed limit 377.

In the case where the driver brakes to speed S2 with third gear engaged, it is important to note that at speed S2 the ETM 150 has very little additional capability to accelerate before the third gear motor speed locus 371 encounters the third gear one of limits 375. Thus, the second gear would appear to be the better choice since the ETM has additional capability to accelerate to speed S3. This further reinforces the need for the driver to have information about limitations that affect the ability of the ETM to provide power, either through training and experience or by information presented via control system 160 (FIG. 1).

FIG. 4 also shows that for the driver to attempt to engage first (gear 610, FIG. 6) at vehicle speed at S2 would require the ETM rotational speed to exceed the max RPM limit 377, causing an over speed condition. Of course, it would be difficult to force a gear to engage when the ETM is energized and its speed does not cause a desired shifting gear 636 to match the output shaft 129 speed corresponding to the vehicle speed. Instead gears shifting collar 630 or 632 would tend to clash with the particular shifting gear 636.

The more likely cause of an over speed of the ETM is coasting downhill once the transmission is in gear. It may also be possible to over speed the ETM when it is not energized and configured so that it can rotate freely, for example, if the transmission has synchronizers.

Figure 7:
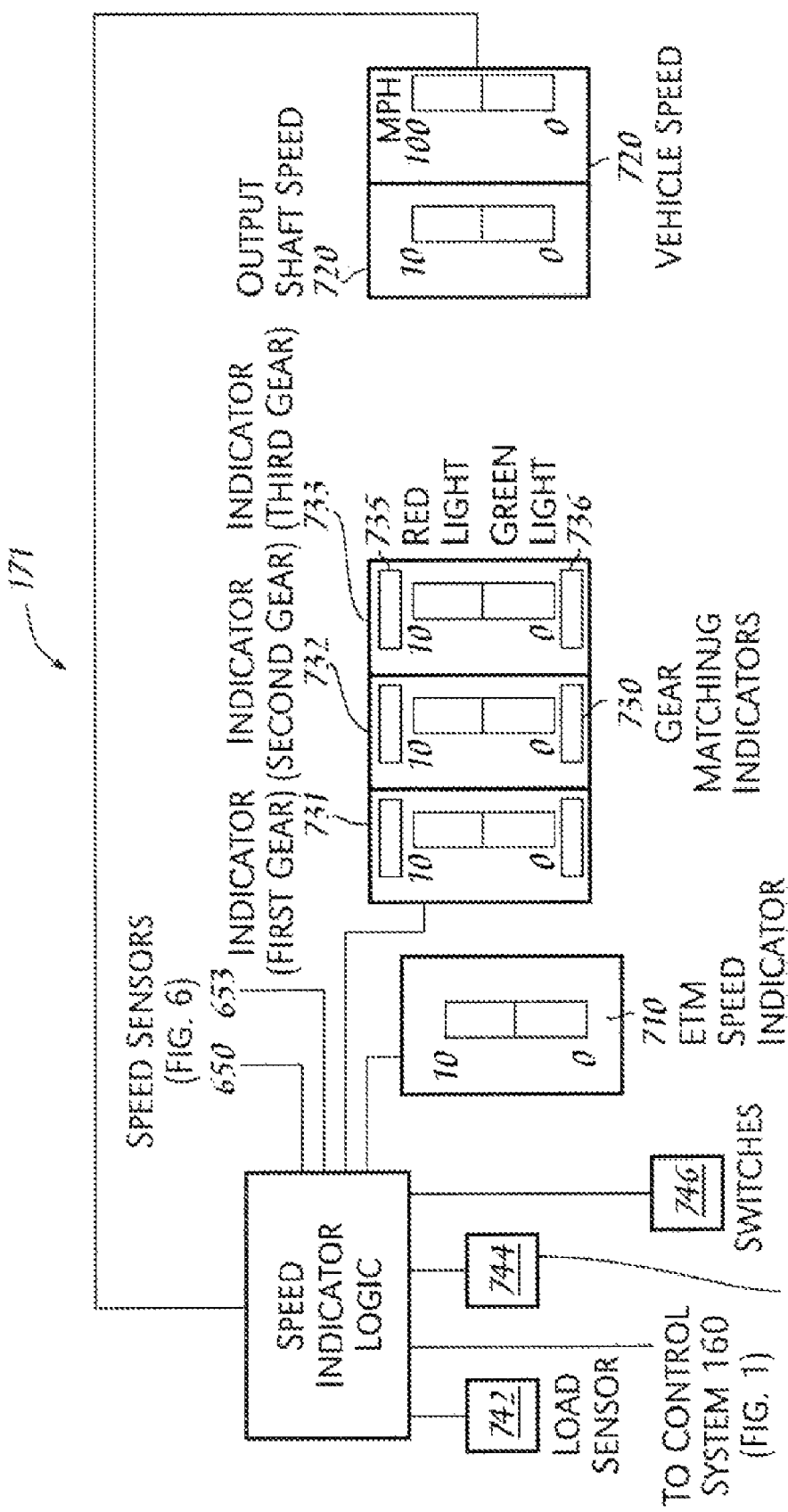
FIG. 7 is a block diagram illustrating the relationship between speed indicators and speed logic according to some embodiments.

FIG. 7 is a block diagram of speed indicators configured to aid the driver in shifting gears while "clutchless" in the ETM operation mode. Speed indicator logic 705 receives signals from speed sensors 650 and 652 which measure the rotational speed of ETM 150 and road wheels 320, respectively. Speed logic 705 also receives a signal from optional load sensor 742 that is proportional to the vehicle load and a signal from optional inclinometer 744 that is proportional to the grade of the road on which the vehicle is traveling. Sensors 742 and 744, therefore, provide information relative to the amount of torque that must be delivered to the vehicle wheels via the transmission output shaft 129. This information is pertinent in determining what transmission gear ratio or gear (first, second, or third) is appropriate for a given vehicle speed, vehicle load, and road grade. Switches 746 provide an indication of the present gear that is engaged (e.g., 610, 612, 614) and thus speed logic is operable to determine when a particular next gear may be shifted into from a particular present gear.

The fixed gear ratios determined by the exemplary combinations 620/610, 622/612 and 624/614 and the PTO gear ratio enable the speed logic 705 to determine the rotational speed of particular gear 610, 612, and 614 for a given rotational speed of ETM 150. That is, for example, shaft speed 125 (which has a fixed relation to ETM 150 speed)×(ratio of the combination of gears 602 and 604)×(ratio of the combination of gears 620 and 610)=speed of gear 610. Likewise, speed sensor 652 allows speed logic 705 to determine the rotational speed of the transmission output shaft 129 for a given vehicle 100 road speed. If one of the shifting gears 636 (e.g., 612) is engaged to output shaft 129, then there is by definition only one correspondence between a particular ETM 150 rotational speed and the vehicle road speed. To shift into a next gear (e.g., 614), requires that transmission 122 go through neutral so that the vehicle speed can be slowed or the ETM 150 rotational speed can be appropriately increased or decreased to match the fixed correspondence between the rotational speed of ETM 150 and vehicle 100 speed for the next gear.

Only two possible scenarios exist for shifting, up-shifting from a lower gear to a higher gear (acceleration sequence) and down-shifting from a higher gear to a lower gear (slowing or generating more torque). When up-shifting, the rotational speed of ETM 150 must always be slowed from a present ETM speed corresponding to a present engaged gear to a future ETM speed corresponding to a next gear to be engaged. When accelerating (up-shifting), it is important to shift the transmission 122 into neutral so that the ETM 150 rotational speed may be slowed without affecting the acquired vehicle 100 speed.

In one embodiment, the ETM speed indicator 710 is normalized to indicate a present ETM rotational speed between a range (e.g., 0-10). That is, logic 705 receives speed signal from sensor 650 and is calibrated according to a predetermined range of rotational speeds for ETM 150 to responsively output a signal for driving indicator 710 through its range, which is scaled from 0 to 10. The present ETM rotational speed is important because with known gear ratios it may be used by the driver to estimate rotational speeds of the individual shifting gears 636 (or by speed logic 705 to calculate those speeds).

Since conventional speedometer 720 of the vehicle presents the driver with the vehicle 100 speed, the driver is able to learn with reference to ETS motor 150 (FIG. 1) speed indicator 710 and conventional speedometer 720 what speed of ETS motor 150 corresponds at various vehicle 100 speeds to the rotational speeds of the shifting gears 636. That is, at a given vehicle speed shown on speedometer 720, the driver learns to select one of shifting gears 610, 612, etc. and manually adjust rotation of ETS motor 150 to a rotation speed shown on indicator 710 that causes the selected one of the gears 610, 612, etc. to match its rotation speed to that of its corresponding shifting collar 630 or 632.

While the above described use of speed indicator 710 with conventional speedometer 720 is advantageous, its usefulness may be limited in certain situations, such as the down-shifting situation described herein above in connection with FIG. 4, and for certain inexperienced drivers. Accordingly, in another embodiment of the invention, additional indicators are presented for the driver as shown in FIG. 7. As will be explained herein below, indicators 721, on the one hand, and indicators 731, 732 and 733, on the other hand, may be used to determine when a next gear to be engaged has the appropriate rotational speed (determined by ETM 150 speed) to now engage the output shaft 129 which has a corresponding rotational speed (determined by vehicle 100 speed). (Indicators 731-733 may vary in number according to, various embodiments of the invention and are also referred to herein as indicator 730.)

Until engaged by one of the shifting collars 630 or 632, the shifting gears 636 rotate freely on the output shaft 129 but still rotate in respective direct proportions to the rotational speed of ETM 150. To shift gears, the driver needs to know when a particular shifting gear 636 has a rotational speed that matches the rotational speed of output shaft 129 and shifting collars 630 and 632. Therefore indicators 731-733 are calibrated to present respective rotational speeds normalized over a range (e.g., 0-10) that corresponds to the same scale as the speed presented by indicator 710, so that if the speed presented by 710 matches the speed presented by indicator 732, for example, this indicates that the speed of shifting gear 612 truly matches that of its corresponding shifting collar 630. That is, logic 705 receives speed signal from sensor 650 and is calibrated according to a predetermined range of corresponding rotational speeds for shifting gear 610 to responsively output a signal to drive indicator 731 through its range, which is scaled from 0 to 10. Likewise, logic 705 is calibrated according to a predetermined range of corresponding rotational speeds for shifting gear 612 to responsively output a signal for driving indicator 732 through its range, which is also scaled from 0 to 10. Likewise, the same applies for shifting gear 612 and indicator 733.

In a similar fashion, output shaft speed indicator 721, is normalized to present the rotational speed of output shaft 129 over a range 0-10. That is, logic 705 receives speed signal from sensor 652 and is calibrated according to a predetermined range of corresponding rotational speeds for shaft 129 to responsively output a signal to drive indicator 721 through its range, which is scaled from 0 to 10.

Therefore, the driver may visually match a speed indication on one of indicators 731-733 with the speed indication of indicator 721 to determine which gear 610, 612, or 614 is suitable to shift into from a neutral position of transmission 122 while the vehicle is moving. In addition, speed logic 705 may compare the calculated speeds of gears 610, 612 and 614 to that of shaft 129 and select a gear 610, etc. that has a speed matching that of shaft 129 within a predetermined limit. Accordingly, logic 705 ouputs a signal for a red light (e.g., 735) on each indicator 731-733 to indicate gears 610, etc. having speeds not compatible with a present output shaft 129 speed, and a signal for a green light (e.g., 736) to indicate gears 610, 612, etc. having speeds that are compatible with shaft 129 speed.

The following sequence of operations may be followed when up-shifting and down-shifting using speed control logic 705 and indicators 710, 721 and 730.

UP-Shifting: Usually associated with acceleration.

In the present example, it is assumed that the vehicle 100 is starting from stop in first gear (ratio 620/610), however, any initial gear that can deliver sufficient torque to the vehicle wheels may be used. It is also assumed that the driver has switched to the ETM mode and correspondingly depressed the clutch to disengage and hold the ICE disengaged from transmission 122. The driver shifts the transmission into first gear and depresses the accelerator pedal which sends a signal to the ETM control system 160 to apply increasing power to the ETM 150. The ETM rotational speed increases in response to the applied power, thereby causing the vehicle 100 speed to increase. At some point the ETM 150 rotational speed (indicated by 710) will be above a desired limit indicating that the vehicle speed will not continue to increase, or at least will not increase at a predetermined sufficient rate, unless the transmission is shifted to a higher gear (e.g., 612).

The driver next shifts to neutral in preparation for shifting to gear 612. Instantaneously, the rotational speed of gear 610 matches the rotational speed of output shaft 129 and gear 612 (rotating at a speed determined by ETM 150) is rotating faster than output shaft 129. The driver has learned from driving an ICE vehicle to "let off on the gas" thereby reduce the speed of the ICE when shifting from a lower gear to a higher gear. With the ETM mode the same action is required. Since ETM 150 is always engaged to transmission 122, the transmission loading will naturally slow ETM 150. In an embodiment of the invention, ETM control system 160 also automatically switches the ETM 150 to the generator mode if speed reduction is not fast enough. The driver then waits until he has an indication that the speed of 612 matches the speed of output shaft 129 to shift from neutral to second gear. It is possible that the driver wants to shift from first to third gear. In this instance, the driver simply waits until ETM 150 has slowed sufficiently and there is an indication that the speed of output shaft 129 matches gear 614.

Down-Shifting: The driver either wants to slow the vehicle or increase torque at a give vehicle speed.

To slow the vehicle, the driver may apply the brake which reduces the vehicle speed. If the transmission gear is still engaged to the output shaft 129, then the control system 160 may also switch the ETM to the generator mode to further decrease vehicle speed while recovering some of the vehicle kinetic energy. In either case, the driver must shift to neutral (unless first gear is engaged) as some point so that the ETM speed can be independently adjusted to match a next lower gear rotational speed. The driver next waits until there is an indication (e.g., green light 736) that a next available lower gear (e.g., first or second) matches the speed of output shaft 129 at the present vehicle speed.

When shifting gears to deliver more torque to the vehicle wheels, the driver does not necessarily want to decrease the vehicle speed, however, it may be necessary to prevent the ETM from exceeding a maximum RPM limit. Switches 746 indicate to speed logic 705 which gear is presently engaged. In an embodiment of the invention, speed logic 705 indicates via an appropriate green light, before shifting into neutral, which lower gears are possible at a given vehicle speed. In this manner, the driver would be able to determine what action to take when he desires additional torque. For example, if the vehicle is moving at a particular speed and the driver is approaching a grade and decides that additional torque will be needed, the lights on the lower gears would indicate if a next lower gear can be engaged without exceeding ETM speed limits. In this case, the driver may shift into neutral, increase ETM rotational speed and then shift to a lower gear when the indicators show a particular lower gear speed matches the speed of the output shaft 129 (vehicle speed). If the indicators show that no lower gears are suitable at a particular vehicle speed, the driver may use braking or switch the ETM to the generator mode while a gear is engaged until a green light indicates a next lower gear is possible at the new vehicle speed.

In another embodiment, gear matching indicators 730 may be configured to indicate a difference between the rotational speed of a shifting gear 636 and the output shaft 129. That is, speed logic 705 computes and outputs a signal to indicator 731 responsive to the difference between the sensed speed of shaft 125 (which has a fixed relation to ETM 150 speed) and the calculated speed of gear 610. Likewise, the same applies for indicator 732 and gear 612 and for indicator 732 and gear 614. This case may also use a normalized range (e.g., 0-10) with the red light 735 positioned at the top (adjacent to 10, the maximum difference indication) and green light 736 positioned at the bottom (adjacent to 0, the minimum difference indication). In this manner, the driver always has an indication of when to shift from neutral to a next gear.

In another feature of the present invention, the speed indications may be presented to the driver visually or audibly or as a combination of the two. For example, such a speed indication may be presented visually as a bar of varying size (as shown in FIG. 7), or as one or more varying numbers, or as a needle displacement, wherein the number or bar size or needle displacement is proportional to indicated speed. Such a speed indication alternatively or also may be presented as a sound of a varying pitch, wherein, for example, a higher pitch may indicate a higher speed.

Herein above, embodiments have been described in which indicators 731-733 present speeds corresponding to rotational speeds of respective ones of gears 610, 612 and 614 at the current ETS motor 150 speed, whereas indicator 710 presents a signal to the driver that corresponds to rotational speed of the ETS motor 150. In another embodiment of the invention, indicators 731-733 present speeds corresponding to rotational speeds of respective ones of gears 610, 612 and 614 at the current road wheel 320 speed as if the respective gears 610, etc. were engaged to their respective shifting collars 630 or 632 even though transmission 122 may be in neutral. That is, logic 705 computes a signal to send indicator 732, for example, responsive to the current rotation of shaft 129 associated with the current road wheel 320 or shaft 129 speed signal from sensor 652 and also responsive to (ratio of the combination of gears 602 and 604)×(ratio of the combination of gears 622 and 612), so that indicator 732 presents a speed that corresponds to the speed that shaft 125 would be turning at for the current road wheel speed as if gear 612 were engaged to shifting collar 630. Likewise, according to this embodiment, the same applies for indicator 731, gears 620 and 610, and collar 630, and for indicator 733, gears 624 and 614, and collar 631.

In a related embodiment, indicators 731-733 may present speed differences. That is, logic 705 computes a signal to send indicator 732, for example, responsive to the difference between current rotation speed of shaft 129 and of shaft 125 as if gear 612 were engaged to shifting collar 630 even though transmission 122 may be in neutral. According to this embodiment, as well, the same applies for indicator 731, gears 620 and 610, and collar 630, and for indicator 733, gears 624 and 614, and collar 631.

In one embodiment, the control system detects the transmission gear in which the vehicle is operating since operation in ETM mode is best if the vehicle has one of the transmission's lower gears engaged. The control system also detects rotational speed of the ICE, e.g., revolutions per minute ("RPM").

A conventional vehicle control system 160 may already include sensors for detecting gear position and ICE rotational speed, in which case additional ETM control devices may interface with these sensors. For example, since about 1993 heavy duty diesel trucks have included an engine control module (ECM) 350 (see FIG. 1) that communicates over a J-bus. In an embodiment, ETM control devices interface via the J-bus with conventional sensors that are typically included or associated with the ECM 350. Alternatively, the ETM controls may include added sensors for detecting vehicle operational states in addition to sensors conventionally included as part of, or in association with, the ECM 350.

The ETM control system 160 includes control logic. In an embodiment, the control logic 160 may include an embedded processor (not shown) having I/O ports that receive signals from the sensors and output control signals to devices in the ETM, such as actuator devices (e.g., clutch actuator 412). The control logic detects operational states of the vehicle responsive to the received sensor signals and generates the output signals responsive to detecting the operational states.

In an exemplary ICE operation mode, the control logic may detect that the vehicle is in a lower gear (e.g., first, second or third) and the rotational speed of the ICE 302 is below 1000 RPM. This condition is ideal for operation in the ETM mode. In this case, control logic may activate output devices of the ETM control system to either automatically shift into the ETM mode or else permit the driver to transfer from the ICE operation mode to the ETM mode. Conversely, if the control logic senses that conditions are not within the limits of the ETM mode, the ETM control system may prevent a transfer from the ICE operation mode to the ETM mode.

In one embodiment, manually transferring to the ETM mode of operation from the ICE mode comprises the following sequence of steps:

1) The control logic determines by analyzing sensor inputs that the vehicle is in an operational state that is suitable for ETM operation and enables controls signals that facilitate the mode transfer.
2) The driver then depresses the clutch pedal to disengage the ICE from the transmission input.
3) The driver shifts the transmission into neutral
4) The driver then switches to the ETM mode and turns off the ICE by switching the ignition switch to the "accessory" position
5) Enables the associated ETM controller in response to selecting the ETM mode which in turn generates a signal that causes the clutch actuator to hold the clutch in the depressed position. A signal sensing the position of the accelerator pedal is used by the ETM controller to determine an amount of power (e.g., voltage) to apply to the ETM. In one embodiment, the amount of power applied to the ETM is varied by pulse width modulation (PWM).
6) The driver then determines which next gear to shift into (from neutral) by adjusting the ETM rotational speed to cause the next gear rotational speed to match the rotational speed of the output shaft (thus the present vehicle speed).
7) Shift the transmission into the next gear.

Once the transmission is shifted into a gear, the drive varies vehicle speed by applying more or less power to the ETM which in turn applies more or less torque to the vehicle wheels via the transmission.

If a desired vehicle operation is not longer possible in the ETM mode, the driver may return to the ICE mode of operation using the following steps:

1) In one embodiment, the driver manually positions his foot to hold in the vehicle clutch pedal at its depressed position in order to insure the ICE remains disengaged from the transmission once the clutch actuator releases the hold on the clutch pedal.
2) The driver then starts the ICE via the conventional ICE ignition switch. This involves rotating the keyed ignition switch from the "accessory" position, through the "off" and "run" positions, and to the spring-return "start" position. Once the ignition switch leaves the "accessory" position and reaches the ICE "start" position, an ETM control signal automatically disables the ETM mode.
3) Signal the ETM controller to remove applied power to the ETM. In one embodiment this entails cause a contactor switch that couples power to the ETM to drop out which kills power to the ETM.
4) Signal the clutch actuator to release its hold on the depressed clutch pedal returning control of the clutch to the driver.
5) Apply power to a starter motor that cranks the ICE to start.
6) Shift the transmission into the neutral position.
7) Adjust the ICE rotational speed (RPM) by means of the accelerator pedal to synchronize the rotational speed of the next gear to be shifted into to correspond to the rotational speed of the transmission output shaft (vehicle speed)
8) Release the clutch to engage the ICE crankshaft to the transmission to operate in the ICE mode.
9) Switch the ETM mode switch to OFF to prevent restart of the ETM in the ignition switch "accessory" position.
10) Alternatively, switch the ETM mode switch to a "Generate" position so a suitably configure ETM is enabled generate a voltage when the ETM is rotated by action of the ICE or by action of the vehicle wheels rotating the transmission. The ETM generator voltage may be used to run accessories or for charging a starter battery of the vehicle or an accessory batter of an auxiliary power system. The term "battery" used herein may include a number of individual series or parallel connected batteries.

In one embodiment, the ETM control system receives sensor signals, detects operational states, generates output signals responsive to detecting operational states, and performs control actions as follows for a manually operated start-up sequence, wherein actions in italics are for an ETM system that includes a fuel cell:

1. Human action ("HA"): Turn diesel engine ignition switch to "accessory" position. Output signal: On=12 vdc/Off=0 vdc
    A. Arm tractor chassis inclinometer sensor to determine terrain grade. Sensor output signal: 0-5 vdc==> computer input signal ("IS")
        i. Parameter delivered to computer input: ±10 vertical angle. If incline signal <2 and >-3 degree angle, Computer action ("CA"): permission.
    B. Arm load cell sensor to determine container weight. Output signal:
        0-5 vdc==> IS
        i. Parameter delivered to computer input: 0-40,000 pounds.
        if weight <35,000 pounds, CA: permission.
    C. Read tractor transmission gear selection from J-Bus
        i. If low gear selection, CA: permission.
    D. Arm APU power system.
        i. CA: Dry contact closure==> Main fuel cell power system contactor closes.
        ii. CA: Dry contact closure==> "ETM armed" light illuminates. Color: yellow. On=12 vdc/Off=0 vdc. Human interface ("HI").
2. CA: Dry contact closure==> "Acknowledge system armed" lighted switch illuminates. Color: yellow
3. HA: Press lighted "ack.system armed" switch==> contact closes==> CA: dry contact closes.
    A. Clutch actuator drive motor solenoid energized. On=12 vdc/Off=0 vdc
    B. Brake air compressor motor solenoid energized. On=12 vdc/Off=0 vdc
        i. IF IS from low (e.g., 100 psi) air brake pressure switch sensor in tractor brake system, CA: dry contact closure C. Motor controller ("MC") speed input. 0-5 vdc IS from current sensor in charging system. 0-50 mvdc
D. Auxiliary power system air blower motor solenoid energized.
  On=12 vdc/Off=0 vdc
  i. IS charging system current sensor. 0-50 mvdc. If current>(predetermined threshold), CA: dry contact closure.
E. H2 fuel supply valve solenoid energized (to open). On=12 vdc-Off=0 vdc
CA: Dry contact closure
F. H2 purge valve/timer armed (energized) to purge line for a short time (e.g., 2 sec.). Solenoid On=12 vdc-Off=0 vdc
  i. IS charging system current sensor. 0-50 mvdc. If current>(predetermined threshold), CA: dry contact closure.
G. Coolant flow pump motor energized. On=12 vdc-Off=0 vdc
  i. IF IS fuel cell current shunt>1 mV (indicating>10 amps fuel cell), CA: dry contact closure.
H. Coolant flow heat exchanger fans:
  i. Heat exchanger fan #1.On=12 vdc-Off=0 vdc
  IS from temperature sensor in cooling system. RTD 0-100 ohms=(predetermined range) Deg F.
  If Temp >130 Deg. F., CA: dry contact closure.
  ii. Heat exchanger fan #2.On=12vdc-Off=0 vdc
  IS from temperature sensor in cooling system. RTD 0-100 ohms=predetermined range of Deg F.
  If Temp >140 Deg. F., CA: dry contact closure.
I. Energize (ICE mode)/De-energize (ETM mode) battery charging system 25 generator.
  i. IS from temperature sensor in cooling system. RTD 0-100 ohms=predetermined range of Deg F.
  If Temp >120 Deg. F., CA: dry contact closure==> Energize.
  ii. IS from temperature sensor in cooling system. RTD 0-100 ohms=predetermined range of Deg F.
  If Temp >150 Deg. F., CA: dry contact closure==> Deenergize.

In one embodiment, the ETM control system receives sensor signals, detects operational states, generates output signals responsive to detecting operational states, and performs control actions for a manually operated shut down sequence in a corollary fashion.

In another embodiment, the ETM control system receives sensor signals, detects operational states, generates output signals responsive to detecting operational states, and performs control actions as follows for an automatic start-up sequence, wherein actions in italics are for an ETM system that includes a fuel cell:

1. HA: Turn diesel engine ignition switch to accessory position.
  Output signal: On=12 vdc/Off=0 vdc
2. "Acknowledge system armed" illuminated switch illuminates. Color red.
3. HA: Press "ack.system armed" illuminated switch==> contact closure.
  A. Arm tractor chassis inclinometer sensor to determine terrain grade. Sensor output signal: 0-5 vdc==>computer input signal ("IS")
    i. Parameter delivered to computer input: ±10 vertical angle. Computer action ("CA"): permission if <2 and >-3 degree angle
  B. Arm load cell sensor to determine container weight.
    Output signal:
    0-5 vdc==> IS
    i. Parameter delivered to computer input: 0-40,000 pounds.
    CA: permission if <35,00 pounds
  C. Read tractor transmission gear selection from J-Bus.
    i. CA: permission if low gear selection.
  D. Read tractor speed from J-Bus.
    i. CA: permission if speed <20 MPH.
  E. CA: De-energize battery power pack alternator.
  F. CA: Shut down main ICE.
  G. Arm APU power system.
    111i. Main fuel cell power system contactor closes. CA: Dry contact closure. ii. "ETM armed light" illuminates. Color: yellow. On=12 vdc/Off=0 vdc. Human interface ("HI").
  H. Clutch actuator drive motor solenoid energized. On=12 vdc/Off=0 vdc
    i. IS from "ack.system armed" switch. CA: Dry contact closure
  I. Brake air compressor motor solenoid energized. On=12 vdc/Off=0 vdc
    i. IF IS from low (e.g., 100 psi) air brake pressure switch sensor in tractor brake system, CA: dry contact closure
  J. Motor controller ("MC") speed input. 0-5 vdc IS from current sensor in charging system. 0-50 mvdc
  K. Auxiliary power system air blower motor solenoid energized.
    On=12 vdc/Off=0 vdc
    i. IS charging system current sensor. 0-50 mvdc. If current>(predetermined threshold), CA: dry contact closure.
  L. H2 fuel supply valve solenoid energized (to open). On=12 vdc-Off=0 vdc
  CA: Dry contact closure
  M. H2 purge valve/timer armed (energized) to purge line for a short time (e.g., 2 sec.). Solenoid On=12 vdc-Off=0 vdc
    i. IS charging system current sensor. 0-50 mvdc. If current>(predetermined threshold), CA: dry contact closure.
  N. Coolant flow pump motor energized On=12 vdc-Off=0 vdc
    i. IF IS fuel cell current shunt >1 mV (indicating >10 amps fuel cell), CA: dry contact closure.
  O. Coolant flow heat exchanger fans:
    i. Heat exchanger fan #1.On=12 vdc-Off=0 vdc
    IS from temperature sensor in cooling system. RTD 0-100 ohms=(predetermined range) Deg F.
    If Temp >130 Deg. F., CA: dry contact closure.
    ii. Heat exchanger fan #2. On=12 vdc-Off=0 vdc
    IS from temperature sensor in cooling system. RTD 0-100 ohms=predetermined range of Deg F.
    If Temp >140 Deg. F., CA: dry contact closure.
  P. Energize (ICE mode)/Deenergize (ETM mode) battery charging system generator.
    i. IS from temperature sensor in cooling system. RTD 0-100 ohms=predetermined range of Deg F.
    If Temp >120 Deg. F., CA: dry contact closure==> Energize.
    ii. IS from temperature sensor in cooling system. RTD 0-100 ohms=predetermined range of Deg F.
    If Temp >150 Deg. F., CA: dry contact closure==> Deenergize.

In an embodiment, the ETM control system 160 receives sensor signals, detects operational states, generates output signals responsive to detecting operational states, and performs control actions for an automatic shut down sequence in a corollary fashion.

A driver may inadvertently cause the ETM 150 to rotate at an excessive rotational speed by leaving the transmission 122 in a gear that is too low for a given vehicle speed. An over-speed hazard is aggravated by the fact that ETM 150 is much quieter than an ICE 302, therefore a driver may not immediately recognize an over-speed hazard. The over-speed hazard is also aggravated because the main ICE clutch 120 no longer serves the conventional function of disengaging the transmission from its motive driver (ETM 150) in ETM mode. In order to address the over-speed hazard, in one embodiment an alarm is provided that signals when the ETM 150 experiences an over-speed condition. For example an AC induction-type ETM may have a predetermined rotational speed limit of 6000 RPM while a DC motor ETM may have a somewhat lower over-speed limit. In some embodiments described herein, the alarm may be audible or visual or both. The driver may manually shift the transmission 122 to neutral in response to having an over-speed indication.

In another embodiment, the gear assembly of power take-off 140 includes a PTO clutch mechanism for disengaging the ETM from the PTO when operating in ICE mode. An exemplary solenoid operated actuator may be provided to disengage the PTO clutch in response to receiving a control signal generated when an ETM over-speed condition is detected.

In one embodiment, the vehicle's clutch pedal is automatically held in by a clutch actuator in response to a signal generated when the ETM mode is activated thereby disengaging the ICE from the transmission 120. In another embodiment, the clutch actuator may be operated to automatically release the ICE clutch in response to detection of an ETM over-speed condition. Additionally, detection of an ETM over-speed condition may also switch the vehicle out of ETM mode.

Figure 12:
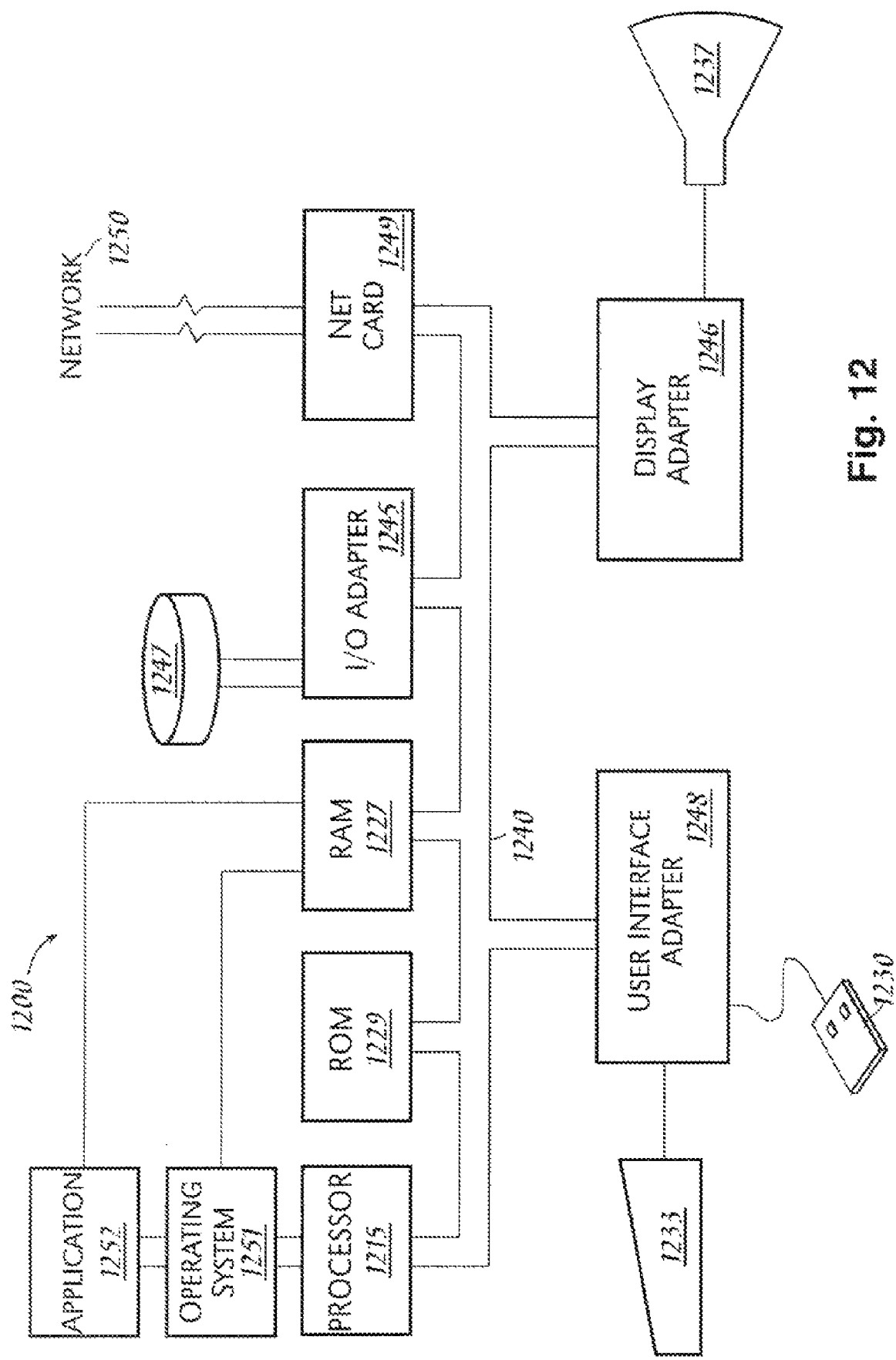
FIG. 12 is a block diagram of a computer system suitable for implementing controller functions of embodiments described herein.

Referring now to FIG. 12, a computer system 1200 in which control-related processes of the embodiments herein may be implemented. It should be understood that the term "computer system" is intended to encompass any device having a processor that executes instructions from a memory medium, regardless of whether referred to in terms of an embedded controller, microcontroller, personal computer system (hardened or otherwise), or in some other terminology. Computer system 1200 includes processor or processors 1215, a volatile memory 1227,.e.g., RAM and a nonvolatile memory 1229. Memories 1227 and 1.229 store program instructions (also known as a "software program"), which are executable by processors 1215, to implement various embodiments of a software program in accordance with the present invention. Processor or processors 1215 and memories 1227 and 1229 are interconnected by bus 1240. An input/output adapter 1245 is also connected to bus 1240 to enable information exchange between processors 1215 and other devices or circuitry. System 1200 is also adapted for at least temporary connection of a keyboard 1233 and pointing device 1230 (e.g., mouse). A display adapter 1246 may be used to interface with one or more display devices 1237.

The illustrated embodiment also includes a disk drive 1247 for data storage and an operating system 1251 and software applications 1252. The operating system 1251 may be programmed in specialized chip hardware (not shown). I/O devices not explicitly shown may include other devices such as tape drives.

Storing of data may be performed by one or more processes of computer system 1200 and may include storing in a memory such as memory 1227 or 1229 of computer system 1200 on which the process is running or on a different computer system, for example to a system (not shown) coupled to network 1250 and accessed via network card 1249.

Additionally, at least some of the control-related processes of the embodiments herein are capable of being distributed in the form of a computer readable medium of instructions executable by a processor to perform a method, i.e., process, such as described herein above. Such computer readable medium may have a variety of forms. The embodiments herein apply equally regardless of the particular type of signal bearing media actually used to carry out the distribution. Examples of tangible computer readable media include recordable-type media such a floppy disk, a hard disk drive, a RAM, and CD-ROMs. Examples of transmission-type media include digital and analog communications links.

Various embodiments may implement the one or more software programs in various ways, including procedure-based techniques, component-based techniques, and/or object-oriented techniques, among others. Specific examples include XML, C, C++ objects, Java and commercial class libraries. Those of ordinary skill in the art will appreciate that the hardware depicted herein may vary depending on the implementation. The depicted example is not meant to imply architectural limitations with respect to the present invention.

Numerous advantages may be appreciated from the foregoing. For example, the embodiments herein provide new emissions reduction opportunities. These opportunities are particularly attractive for heavy duty diesel trucks because these vehicles emit not only nitrous oxides, which contributes to ozone depletion, but also diesel particulate matter. Ultra-violet radiation, which may be increased by ozone depletion, and diesel particulate matter both present health risks if in high concentrations.

To further appreciate the new emissions reduction opportunities, consider again FIG. 1. In one embodiment of the invention, battery 170 and motor 150 may be additions to a conventional vehicle 100. In this case, it would be advantageous for battery 170 and ETM 150 to be of such limited sizes that they may be added to vehicle 100 at limited cost and limited change to the configuration of vehicle 100. However, since battery 170 and ETM 150 may only supply traction power for vehicle 100 in an ETM mode of operation it is understood that battery 170 and ETM 150 should must be of sufficient size to operate vehicle 100. Battery 170 and ETM 150, therefore, should have sufficient capability to handle conventional loads that vehicle 100 may encounter in ordinary use.

Nevertheless, it may be intentional, in one embodiment, that battery 170 and ETM 150 are selected to have an extreme limited size, and thus capabilities for delivering mechanical power, that the ability of a vehicle 100 to handle some conventional loads in certain ordinarily encountered circumstances is limited, for example, when vehicle 100 is a heavy duty diesel truck. This embodiment may be configured to be so limited in order for ETM 150 and battery 170 to satisfy cost, size and weight constraints.

As an example, electric traction motor 150 and battery 170 may have insufficient capacity to operate vehicle 100 in higher gears of transmission 122, such as above third gear that ordinarily enable speeds encountered required for regular road use. In another exemplary embodiment, ETM 150 and battery 170 may have insufficient capacity for operation of fully loaded vehicle 100 in certain gears on or above a particular a percentage.

It should be appreciated that in cases where ETM 150 and battery 170 are intentionally of limited size and performance and where operational demands may include higher speed driving or driving up a grade the driver or system may need to episodically alternate between the ETM operation mode and ICE mode more frequently than would be necessary for slow speed driving, stopping, and idling. As a consequence, when ETM 150 and battery 170 are intentionally of limited size and operational demands include higher speed driving, alternating between the ETM and ICE modes may be required even while the vehicle is moving.

It should be further appreciated that coupling ETM 150 to transmission 122 using a the transfer gear of a PTO 140 provides a more economical and straightforward coupling of electric motor 150 to conventional transmission 122 and is inventive and counterintuitive. This is particularly true for the case where transmission 122 a manual transmission and the use of clutch 120 for shifting gears of the transmission is prevented.

Thus, in one embodiment both the performance of ETM 150 and battery 170 and gear shifting limitations may present challenges to operating of vehicle 100. Nevertheless, using embodiments herein that may be conventionally and intuitively considered unacceptable in some cases, these embodiments enable practical and very beneficial applications. However, embodiments having the limited performance of ETM 150 and battery 170 and the aforementioned gear shifting limitations may enable modification of tens of thousands of existing heavy duty diesel driven trucks so that they may be operated intermittently and in limited circumstances in an ETM mode. These embodiments provide an accomplishment that has previously not been economically feasible. Moreover, these embodiments demonstrate that the intentionally adopted limitations are compatible with use on streets and highways in dense urban areas which further enable emissions reduction in areas of greatest need, i.e., areas of the greatest concentration of heavy duty diesel trucks.

It should also be appreciated from the forgoing that difficulties presented by both the performance limitations of certain sizes of ETM 150 and battery 170 and the "clutchless" gear shifting limitations may be mitigated by certain features of controls added to the vehicle.

The embodiments described herein were chosen and described in order to best explain the principles of the invention and to enable others of ordinary skill in the art to understand the features and advantages. Various other embodiments having various modifications not described may be suited to a particular contemplated use but may still be within the scope of the present invention.

For example, referring again to FIG. 1, battery 170 may be also or alternatively be recharged by a fuel cell 180 (e.g., a hydrogen fuel cell) included on vehicle 100, where the exemplary hydrogen fuel cell is supplied by a canister of compressed hydrogen contained on vehicle 100. Besides charging battery 170 to supply power for motor 150, the exemplary fuel cell 180 may also charge conventional tractor system 12 VDC battery 310. The KW capacity of fuel cell 180 and storage capacity of canister 181 may vary from one embodiment to the next. In one embodiment, the fuel cell 180 has a 15 KW capacity, and the canister 181 has 1 KG of hydrogen storage capacity at 100 pounds per square inch (psi).

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

Figure 8:
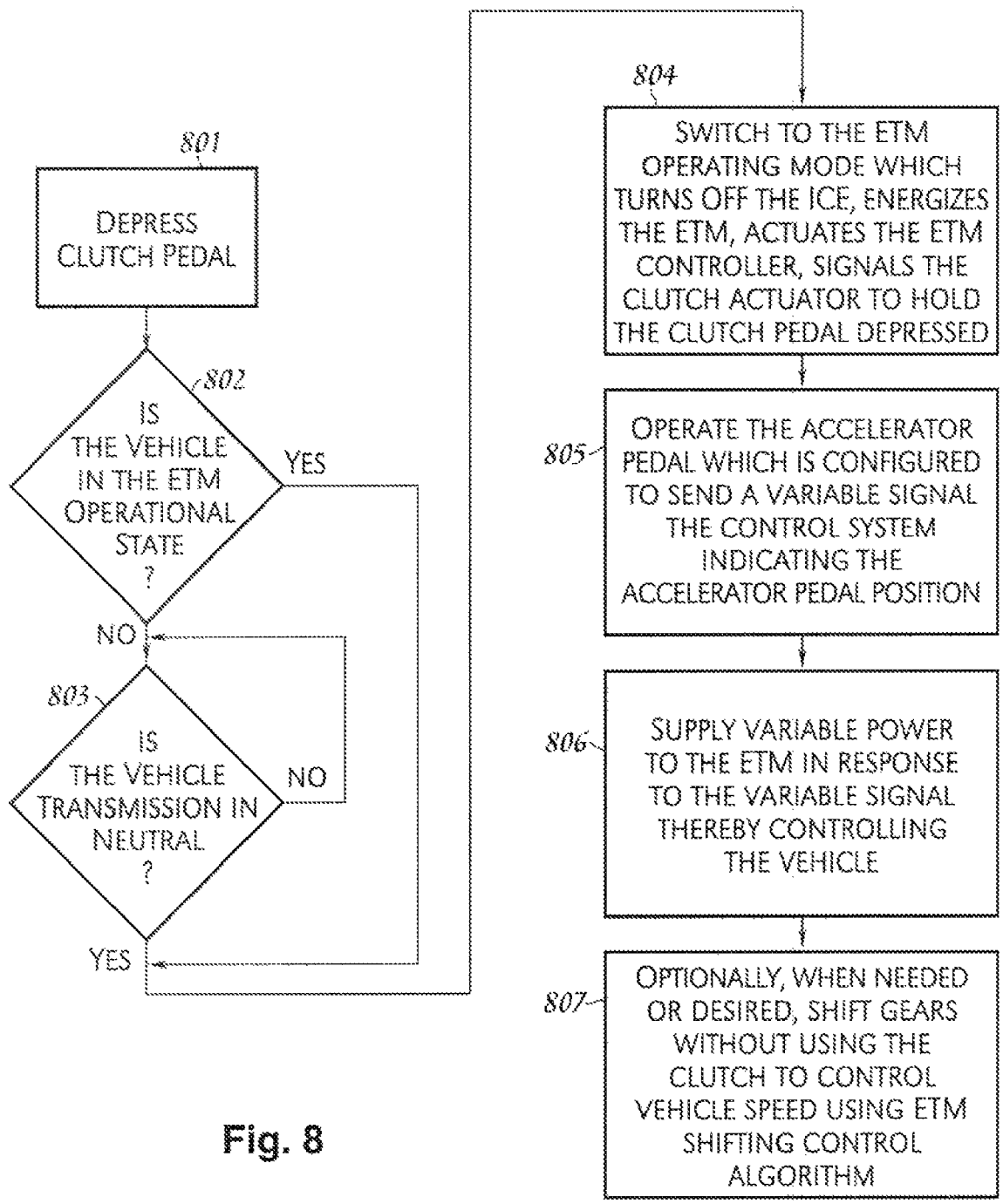
FIG. 8 is a flow diagram of steps used in an embodiment herein.

FIG. 8 is a flow diagram of steps used in embodiments described herein. In step 801 the clutch pedal is depressed. In step 802 a determination is made whether the vehicle is in the ETM operational state. If the result of the test in step 802 is YES, then a branch is made to step 804 where one or all the necessary actions are executed. If the result of the test in step 802 is NO, then a test is done to determine if the transmission is in neutral. If the transmission is not in neutral then a wait is executed until neutral is attained. If the transmission is in neutral, the actions of step 804 are executed; switch to the ETM operating mode, turn OFF the ICE and energize the ETM, enable the ETM controller, and signal the clutch actuator to hold the clutch pedal depressed. In step 805, accelerator pedal is operated thereby sending a variable signal indicating the accelerator position. In step 806, variable power is supplied to the ETM in response to the variable signal from the accelerator pedal to control the vehicle. In step 807, the gears are shifted without using the clutch, when needed or desired, to control vehicle speed using an ETM shifting control algorithm.

Figure 9:
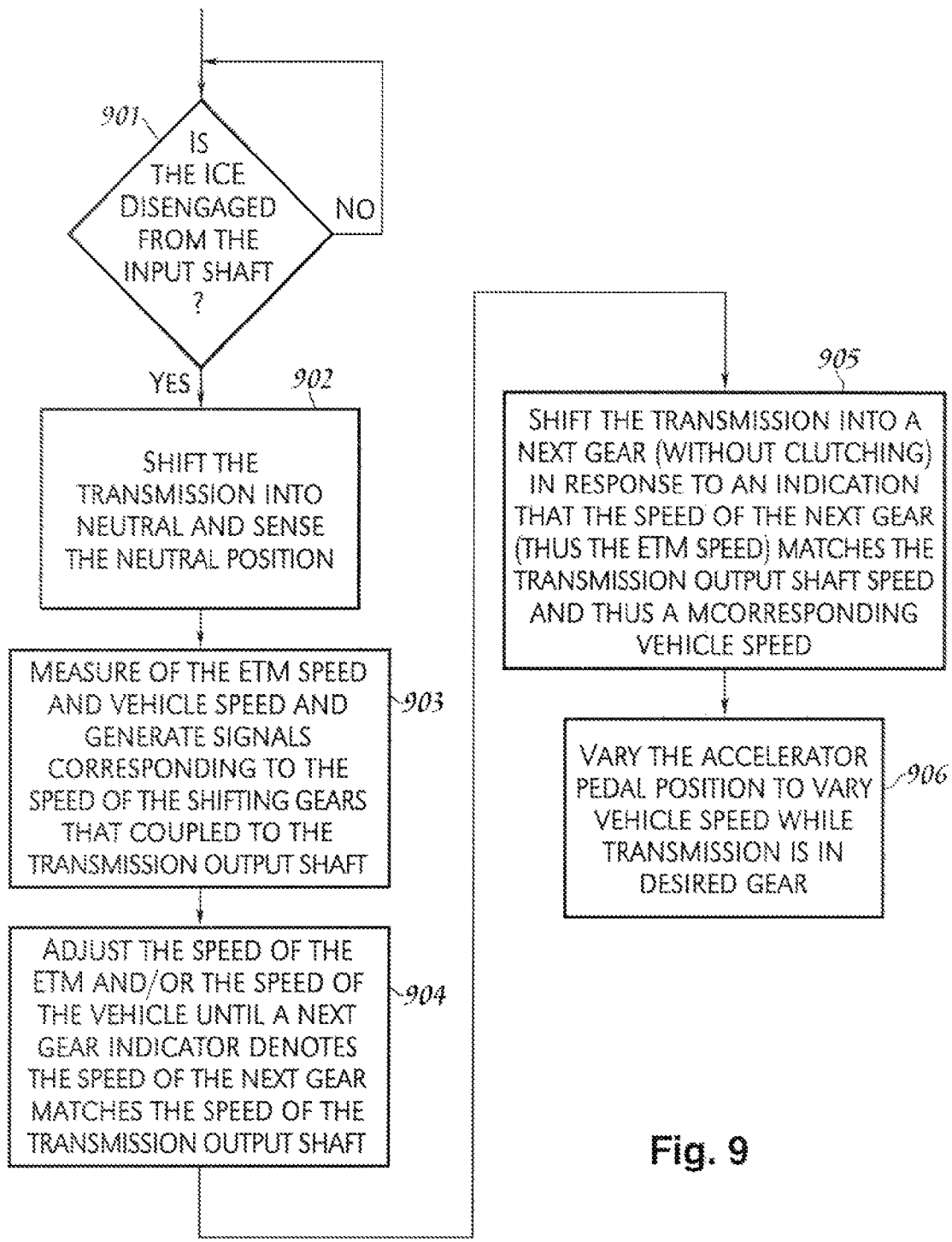
FIG. 9 is a flow diagram of steps used in another embodiment herein.

FIG. 9 is a flow diagram of steps used in embodiments described herein. In step 901, a determination is made whether the ICE is disengaged from the transmission input shaft. If the result from step 901 is NO then a wait is initiated. If the result of the determination is YES, then in step 902 the transmission is shifted into neutral and the neutral position is sensed. In step 903, the ETM speed and the vehicle speed are measured and signals are generated corresponding to the speed of the shifting gears and the output shaft. In step 904, the speed of the ETM and/or the speed of the vehicle are adjusted until a next gear indicator denotes the speed of the next gear that matches the speed of the transmission output shaft. In step 905, the transmission is shifted to a next gear without clutching in response to an indication that the speed of the next gear (ETM speed) matches the transmission output shaft speed (vehicle speed). In step 906, the accelerator pedal position is varied to vary the vehicle speed while the transmission is in a desired gear.

Figure 10:
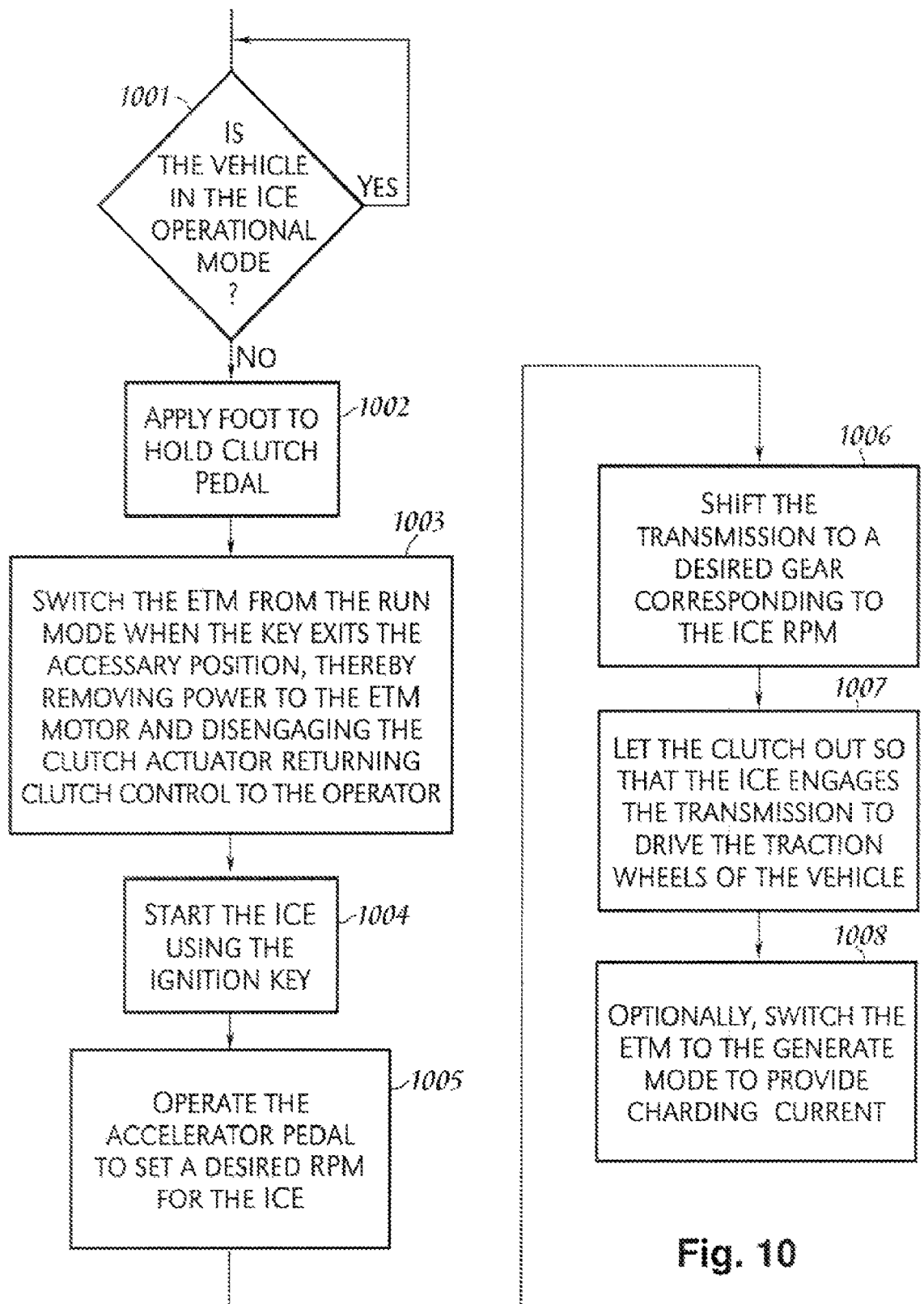
FIG. 10 is a flow diagram of steps used in another embodiment herein.
Figure 11:
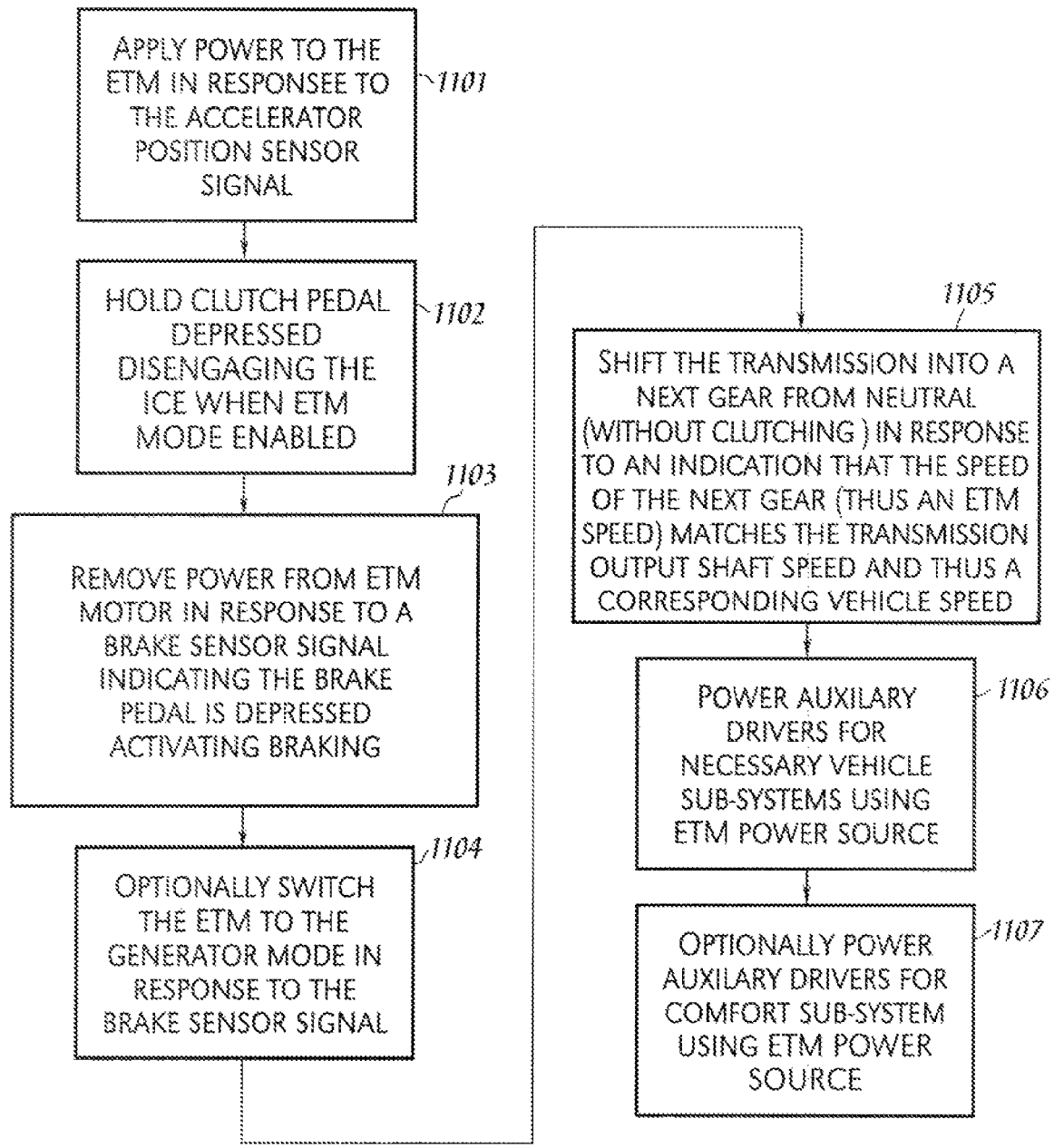
FIG. 11 is a flow diagram of steps used in an embodiment herein.

FIG. 10 is a flow diagram of steps used in embodiments described herein. In step 1001 a determination is made whether the vehicle is in the ICE mode. If the result of the determination in step 1001 is YES, then a wait is executed. If the result is NO, then the foot of the operator is applied to hold the clutch pedal in step 1002. In step 1003, the ignition key is switched from an accessory position thereby removing power form the ETM and disengaging the clutch actuator that holds the clutch pedal depressed returning clutch control to the operator. In step 1004, the ICE is started using the ignition switch. In step 1005, the accelerator pedal is operated to achieve a desired RPM for the ICE. The transmission is shifted to a desired gear in step 1006. In step 1007, the clutch is released to engage the ICE with the transmission input shaft to drive the traction wheels of the vehicle. Optionally, the vehicle is switched to ETM mode to the generate mode to generate battery charging current.

FIG. 10 is a flow diagram of steps used in embodiments described herein. In step 1101, power is applied to the ETM in response to the accelerator position sensor signal. In step 1102, the clutch pedal is held depressed disengaging the ICE by enabling the ETM mode. In step 1103, power is removed from the ETM in response to a sensor signal indicating the brake pedal is depressed activating braking. In step 1106, auxiliary drivers for necessary vehicle sub-systems are enabled and powered using the ETM power source. In step 1107, the auxiliary drivers are powered with the ETM power source.

A number of embodiments of the invention have been described. Nevertheless, it will be understood that various modifications maybe made without departing from the spirit and scope of the invention.

What is claimed is:

1. A vehicle having a transmission for driving a differential coupled to traction wheels comprising:
    an internal combustion engine (ICE) coupled through a clutch to a transmission input shaft of the transmission, wherein the ICE is engaged to rotate the transmission input shaft when a clutch pedal operating the clutch is not depressed, and wherein the ICE is disengaged from the transmission input shaft when the clutch pedal is depressed;
    a transfer gear set coupled to a power take-off (PTO) port of the transmission that is coupled to the transmission input shaft;
    an electric traction motor (ETM) having an output shaft coupled to an output shaft of the transfer gear set, wherein, in an ETM operational mode, the ETM rotates the transmission input shaft in response to power applied to the ETM when the ICE is disengaged from the transmission input shaft, and, wherein, in an ICE operational mode, the ETM is rotated in response to rotation of the transmission input shaft when the clutch engages the ICE to the transmission input shaft;
    a control system receiving signals from an electrical system of the vehicle and sensors monitoring operations of the vehicle and generating output control signals;
    an auxiliary electrical power system coupled to power the ETM and sub-systems of the vehicle when in the ETM operational mode;
    one or more actuators receiving power from the auxiliary power system in response to the output control signals when in the ETM operational mode, wherein one of the actuators is a clutch actuator that holds the clutch pedal depressed, when in the ETM operational mode, and releases the clutch pedal when in the ICE operational mode; and
    one or more indicators configured to present to a user, in the ETM operational mode, a signal indicating when to shift from neutral to cause a shifting collar rotating at a speed determined by the vehicle speed to engage a next shifting gear rotating at a speed determined by an ETM rotational speed.

2. The vehicle of claim 1, wherein the one or more indicators indicate the ETM rotational speed and thus a speed of the shifting gears.

3. The vehicle of claim 2, wherein the one or more indicators indicate the vehicle speed and thus a speed of the shifting collars coupled to the transmission output shaft.

4. The vehicle of claim 2, wherein the one or more indicators present an indication of a difference in rotational speed between a particular shifting gear and the shifting collars coupled to a transmission output shaft.

5. The vehicle of claim 4, wherein the one or more indicators present a light that is ON when a particular shifting gear may be engaged by a shifting collar.

6. The vehicle of claim 4, wherein the one or more indicators present a light that has a particular color when a particular shifting gear may be engaged by a shifting collar.

7. The vehicle of claim 1, wherein the control system includes control logic that receives a plurality of sensor signals and generates speed indication signals coupled to the one or more indicators and gear matching signals.

8. The vehicle of claim 7, wherein the control logic receives a sensor signal indicating a speed proportional to a speed of the ETM, a sensor signal indicating a speed proportional to a speed of the vehicle, a sensor signal indicating vehicle loading, a sensor signal indicating an incline of the vehicle relative to a road surface, and switch signals indicating a present position of a gear shifter and generates the speed indication signals and gear matching signals for the one or more displays.

9. The vehicle of claim 8, wherein the control logic processes the sensor signals and generates an indication of which shifting gear to engage to optimize operations of the vehicle.

10. The vehicle of claim 1, wherein the sensor monitoring operations of the vehicle include a variable signal indicating a position of an accelerator pedal and a brake signal indicating when the vehicle is braking.

11. The vehicle of claim 10, wherein the ETM is switched into a generator mode in response to the brake signal.

12. A method of operating a vehicle having a transmission with a transmission input shaft coupled by a clutch to an internal combustion engine (ICE), the transmission input shaft further coupled to a drive shaft of an electric traction motor (ETM) through a transfer gear set coupled to a power take-offport of the transmission, the method comprising:
    enabling a control system receiving signals from an electrical system of the vehicle and sensors monitoring operations of the vehicle and generating output control sigials;
    enabling an ETM operational mode of the control system in response to an ETM mode signal and a signal indicating the ICE is powered OFF;
    signaling a clutch actuator to hold a clutch pedal in a depressed position in response to the ETM mode signal, wherein the clutch disengages the ICE from the transmission input shaft when the clutch pedal is depressed and engages the ICE to the transmission input shaft when the clutch pedal is not depressed;
    determining a rotational speed of each of a plurality of shifting gears driven by the ETM in response to a first speed signal;
    determining a rotational speed of shifting collars coupled to the output shaft of the transmission in response to a second speed signal;
    generating a shift indication when a particular shifting gear matches the rotational speed of a particular shifting collar; and
    shifting from neutral to engage the particular shifting collar with the particular shifting gear without disengaging the ETM from the transfer gear set in response to observing on one or more displays the shift indication.

13. The method of claim 12, further comprising turning OFF the ICE with the ignition switch and turning ON the ETM operation mode when the ignition switch is in the accessory position.

14. The method of claim 13 further comprising:
    operating an accelerator pedal of the vehicle thereby sending a variable signal to the control system; and
    supplying variable power to the ETM from an auxiliary power system in response to the variable signal to thereby control a speed of the vehicle.

15. The method of claim 14 further comprising adjusting the speed of the ETM and/or the vehicle speed until the one or more display has a shift indication that a particular shifting gear matches the rotational speed of a particular shifting collar.

16. The method of claim 13 further comprising:
holding the clutch pedal in the depressed position;
switching the ignition switch from the accessory position thereby signaling the control system to disconnect power from the ETM thereby releasing the clutch actuator;
starting the ICE using the ignition switch;
operating the accelerator pedal to set a desired rotational speed for the ICE;
engaging a desired shifting gear corresponding to the vehicle speed and the ICE rotational speed; and
releasing the clutch pedal to engage the ICE with the transmission input shaft.

17. The method of claim 16 further comprising switching the ETM to a generator mode to provide battery charging current.

18. The method of claim 13 further comprising:
removing power from the ETM when in the ETM operational mode in response to a brake signal indicating the brake pedal is depressed thereby activating braking; and
shifting to a lower shifting gear from neutral in response to a shift indication that a speed of the next lower shifting gear matches a speed of a shifting collar coupled to the transmission output shaft.

19. The method of claim 18 further comprising switching the ETM to a generator mode in response to the brake signal.

20. The method of claim 14, further comprising providing power to auxiliary drivers for necessary vehicle sub-systems using the auxiliary power source.

21. The method of claim 20, wherein the auxiliary drivers comprise drivers for comfort sub-systems.

22. An apparatus in a vehicle having an internal combustion engine ("ICE") mechanically coupled via a manual clutch to an input of a transmission, the clutch being operable, responsive to actuation by a driver, for disengaging the ICE from the transmission input, the apparatus comprising:
an electric motor coupled to the transmission input via a transfer gear such that operation of the clutch to disengage the ICE from the transmission input does not disengage the electric motor from the transmission input, wherein the transmission includes an output coupled to road wheels of the vehicle to thereby power rotation of the road wheels;
an actuator coupled to the clutch;
controls operable to position the actuator to hold the clutch with the ICE disengaged from the transmission input so the road wheels are powered by the electric motor instead of the ICE, wherein the transmission includes shifting gears and a shifting mechanism having a neutral position, wherein in the neutral position the shifting gears are disengaged from the transmission input, the transmission having engaged positions for the respective shifting gears, wherein with the shifting mechanism in respective engaged positions, the shifting gears engage the transmission output and have fixed rotational relationships with respect to the rotation of the road wheels;
a first speed indicator operable to present to the driver a speed dependent upon rotation of the electric motor; and
a second speed indicator operable to present to the driver a speed dependent upon the rotation of the road wheels, so that with the road wheels rotating and the ICE disengaged from the transmission input via the clutch, the driver may select and engage one of the shifting gears by i) shifting the shifting mechanism to the neutral position, ii) adjusting the rotation of the electric motor by reference to the first and second speed indicators to match rotation of a selected shifting gear for current rotation of the road wheels, and iii) shifting the shifting mechanism to a position engaging the selected shifting gear to the transmission output.

23. The apparatus of claim 22, wherein the first indicator is associated with the selected shifting gear, the apparatus further comprises:
speed logic operable for receiving a speed signal dependent upon rotation of the electric motor, adjusting the speed signal responsive to a predetermined gear ratio associated with the selected shifting gear, and sending the adjusted speed signal to the first indicator, wherein a speed indication presented by the first indicator is responsive to the adjusted speed signal and is also dependent upon the predetermined gear ratio associated with the selected shifting gear.

24. The apparatus of claim 22, wherein the second indicator is associated with the selected shifting gear, the apparatus further comprises:
speed logic operable for receiving a speed signal dependent upon rotation of the road wheels, adjusting the speed signal responsive to a predetermined gear ratio associated with the selected shifting gear, and sending the adjusted speed signal to the second indicator, wherein a speed indication presented by the second indicator is responsive to the adjusted speed signal and is also dependent upon the predetermined gear ratio associated with the selected shifting gear independently of whether the selected shifting gear is engaged in fixed rotational relationship to the transmission output, so that the second indicator presents a rotation speed for the selected shifting gear as if the selected shifting gear has the fixed rotational relationship to the transmission output regardless of whether the selected shifting gear actually does have the fixed rotational relationship.

25. The apparatus of claim 22, wherein one of the first and second indicators is associated with the selected shifting gear and the apparatus further comprises:
additional indicators associated with additional respective ones of the shifting gears.

26. The apparatus of claim 25, further comprising:
logic operable to generate shifting gear select signals for the current rotation of the road wheels responsive to comparing a speed dependent upon rotation of the road wheels and a speed dependent upon rotation of the electric motor, wherein generating the shifting gear select signals includes adjusting either road wheel speed or electric motor speed responsive to the respective shifting gear select signals, wherein the indicators associated with the respective shifting gear select signals include signaling devices operable to present the shifting gear select signals responsive to receiving the shifting gear select signals from the logic.

27. The apparatus of claim 22, wherein the electric motor is coupled to a power take-off port of the transmission through the transfer gear in a configuration that enables the electric motor to power the output of the transmission via the transfer gear and the power take-off port.

28. The apparatus of claim 22, wherein speed indications presented by the speed indicators include audibly presented speed indications.

29. A method in a vehicle having an internal combustion engine ("ICE") mechanically coupled via a manual clutch to an input of a manual transmission, the clutch being operable, responsive to actuation by a driver, for disengaging the ICE from the transmission, the method comprising:
coupling an electric motor to the transmission input via a transfer gear, such that operation of the clutch to disengage the ICE from the transmission does not disengage the electric motor from the transmission, wherein the transmission includes an output coupled to road wheels of the vehicle;

coupling an actuator to the clutch;

positioning the actuator to hold the clutch with the ICE disengaged from the transmission for powering the road wheels by the electric motor and not the ICE, wherein the transmission includes shifting gears and a shifting mechanism having a neutral position in which the shifting gears are disengaged and having engaged positions for respective shifting gears, wherein with the shifting mechanism in the respective engaged positions the shifting gears engage the transmission output and have fixed rotational relationships with respect to rotation of the road wheels; and presenting to the driver a first speed indication dependent upon rotation of the electric motor and a second speed indication dependent upon rotation of the road wheels, so that with the road wheels rotating and the ICE disengaged from the transmission via the clutch, the driver may select and engage one of the shifting gears by i) shifting the shifting mechanism to the neutral position, ii) adjusting rotation of the electric motor by reference to the speed indicators to match rotation of the selected one of the shifting gears for current rotation of the road wheels, and iii) shifting the shifting mechanism to a position engaging the selected one of the shifting gears to the transmission output.

* * * * *